US008964025B2

(12) United States Patent
Cudak et al.

(10) Patent No.: US 8,964,025 B2
(45) Date of Patent: Feb. 24, 2015

(54) VISUAL OBSTRUCTION REMOVAL WITH IMAGE CAPTURE

(75) Inventors: Gary D. Cudak, Creedmoor, NC (US); Christopher J. Hardee, Raleigh, NC (US); Randall C. Humes, Raleigh, NC (US); Heather C. Miller, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 13/085,391

(22) Filed: Apr. 12, 2011

(65) Prior Publication Data

US 2012/0262569 A1    Oct. 18, 2012

(51) Int. Cl.
*H04N 7/18* (2006.01)
*H04N 13/00* (2006.01)
*H04N 5/222* (2006.01)
(Continued)

(52) U.S. Cl.
CPC ......... *H04N 13/0007* (2013.01); *H04N 5/2226* (2013.01); *H04N 5/2259* (2013.01); *H04N 5/23206* (2013.01); *H04N 5/23229* (2013.01); *H04N 13/0022* (2013.01); *H04N 13/0239* (2013.01); *G06T 5/005* (2013.01); *G06T 5/50* (2013.01); *G06T 2207/10012* (2013.01); *G06T 2207/20221* (2013.01)
USPC .......................................................... 348/135

(58) Field of Classification Search
CPC ........... G06T 2207/10012; G06T 2207/20221; G06T 5/005; G06T 5/50; H04N 13/0007; H04N 13/0022; H04N 13/0239; H04N 5/2226; H04N 5/2259; H04N 5/23206; H04N 5/23229
USPC .......................................................... 348/135
See application file for complete search history.

(56) References Cited

U.S. PATENT DOCUMENTS

| 5,548,362 A | 8/1996 | Wah Lo et al. |
| 5,657,073 A | 8/1997 | Henley |

(Continued)

FOREIGN PATENT DOCUMENTS

| JP | 09-171073 A | 1/1999 |
| JP | 10-092247 A | 10/1999 |
| JP | 17-146443 A | 11/2006 |

OTHER PUBLICATIONS

Reginald Linco, Authorized Officer, PCT International Searching Authority, Canadian Intellectual Property Office, International Search Report for PCT Application No. PCT/CA2012/050214, Jul. 27, 2012, pp. 1-3, Gatineau, Quebec, Canada.

(Continued)

*Primary Examiner* — Mehrdad Dastouri
*Assistant Examiner* — Mohammed Rahaman
(74) *Attorney, Agent, or Firm* — Lee Law, PLLC; Christopher B. Lee

(57) ABSTRACT

An object located within an image foreground relative to image content within a field of view of at least one camera lens is identified, using image processing module, as an image obstruction. Responsive to identifying the image obstruction, points of view of at least one camera lens are determined that provide image content portions of the image content that, in combination, yield a complete image of the image content without the image obstruction located within the image foreground. The image content portions are combined to yield the complete image of the image content without the image obstruction located within the foreground. The combined complete image is stored to a memory.

21 Claims, 12 Drawing Sheets

(51) Int. Cl.
*H04N 5/225* (2006.01)
*H04N 5/232* (2006.01)
*H04N 13/02* (2006.01)
*G06T 5/00* (2006.01)
*G06T 5/50* (2006.01)

(56) References Cited

U.S. PATENT DOCUMENTS

| | | | |
|---|---|---|---|
| 6,295,367 | B1* | 9/2001 | Crabtree et al. ............. 382/103 |
| 7,196,305 | B2 | 3/2007 | Shaffer et al. |
| 7,200,261 | B2 | 4/2007 | Ono |
| 2005/0025357 | A1* | 2/2005 | Landwehr et al. ............ 382/170 |
| 2005/0129324 | A1* | 6/2005 | Lemke ........................... 382/254 |
| 2005/0168594 | A1 | 8/2005 | Larson |
| 2005/0288584 | A1* | 12/2005 | McMorrow et al. .......... 600/437 |
| 2009/0102859 | A1* | 4/2009 | Athsani et al. ................ 345/619 |
| 2010/0011297 | A1 | 1/2010 | Tsai et al. |
| 2010/0271533 | A1 | 10/2010 | Bogusky et al. |
| 2011/0002542 | A1* | 1/2011 | Adcock ......................... 382/181 |
| 2011/0103644 | A1* | 5/2011 | Garten .......................... 382/103 |
| 2011/0242286 | A1* | 10/2011 | Pace et al. ...................... 348/47 |

OTHER PUBLICATIONS

Jim Carnicelli, Stereo vision: measuring object distance using pixel offset, Webpage/site, Aug. 11, 2001 (Printed from website on Apr. 5, 2011), pp. 1-4, The Library of Alexandria, Published on the World Wide Web at http://www.alexandria.nu/ai/blog/entry.asp?E=32.

Cormac Herley, Automatic Occlusion Removal From Minimum No. of Images, Inproceedings of IEEE International Conference on Image Processing 2005 (ICIP), Oct. 2005, pp. 1046-1049, vol. 2, Institute of Electrical and Electronics Engineers, Inc., Published on the World Wide Web at http://research.microsoft.com/pubs/69386/peoplemover.pdf.

Masahiro Kawakita, et al., Axi-Vision Camera (real-time distance-mapping camera), Journal: Applied Optics, Aug. 1, 2000, pp. 3931-3939, vol. 39, No. 22, Optical Society of America, Published on the World Wide Web at http://www.google.com/url?sa=t&source=web&cd=1&ved=0CBgQ9FjAA&url=http%3A%2F%2Fciteseerx.ist.psu.edu%2Fviewdoc%2Fdownload%3Fdoi%3D10.1.1.113.2293%26rep%3Drep1%26type%3Dpdf&rct=j&q=Axi-Vision%20Camera%20~real-time%20distancemapping%.

Huang Lee, et al., Nonstationary Background Removal Via Multiple Camera Collaboration, Proceedings of First ACM/IEEE International Conference on Distributed Smart Cameras 2007 (ICDSC), 2007, pp. 321-327, Institute of Electrical and Electronics Engineers, Inc., Published on the World Wide Web at http://wsnl.stanford.edu/papers/icdsc07_back.pdf.

Author Unknown, Widelux FV: Notes on a Classic Invention, Webpage/site, Publication date unknown, Printed from website on Apr. 5, 2011, pp. 1-3, JumboPrawn.Net, Published on the World Wide Web at http://www.jumboprawn.net/jesse/cams/widelux/widelux_over.html.

Author Unknown, Epipolar geometry, Webpage/site: Wikipedia, Feb. 12, 2011 (Printed from website on Apr. 5, 2011), pp. 1-3, Wikimedia Foundation, Inc., Published on the World Wide Web at http://en.wikipedia.org/wiki/Epipolar_geometry.

Author Unknown, Stereopsis, Webpage/site: Wikipedia, Mar. 30, 2011 (Printed from website on Apr. 5, 2011), pp. 1-5, Wikimedia Foundation, Inc., Published on the World Wide Web at http://en.wikipedia.org/wiki/Stereopsis.

United States Patent and Trademark Office, Office Action for U.S. Appl. No. 13/435,124, Mar. 24, 2014, pp. 1-26, Alexandria, VA, USA.

United States Patent and Trademark Office, Office Action for U.S. Appl. No. 13/435,124, Jul. 8, 2014, pp. 1-11, Alexandria, VA, USA.

Mohammed S. Rahaman, Examiner, United States Patent and Trademark Office, Office Action for U.S. Appl. No. 13/435,124, Dec. 22, 2014, pp. 1-20, Alexandria, VA, USA.

* cited by examiner

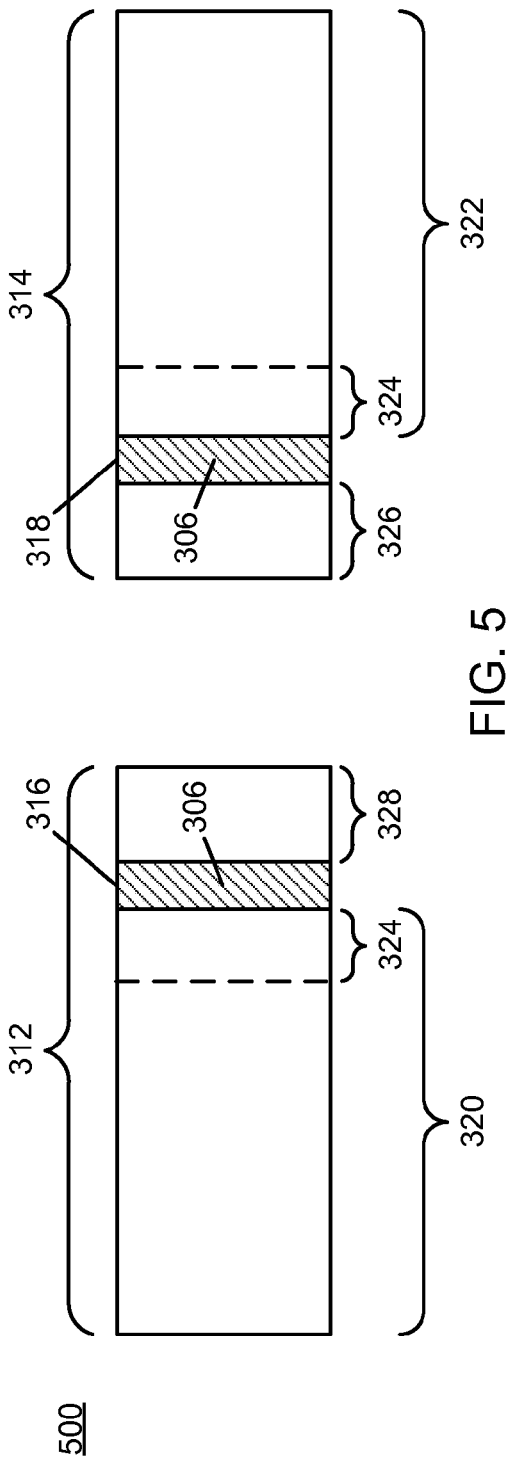
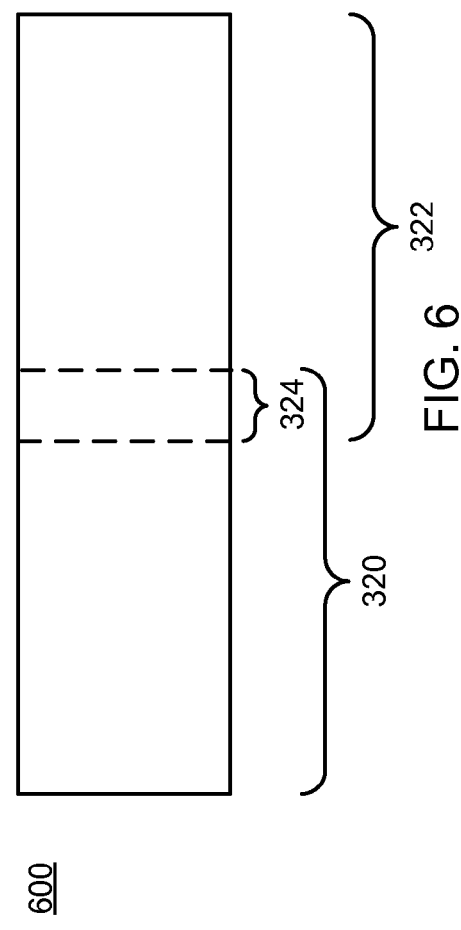

VISUAL OBSTRUCTION REMOVAL WITH IMAGE CAPTURE

BACKGROUND

The present invention relates to photographic image capture. More particularly, the present invention relates to visual obstruction removal with image capture.

Camera devices operate to capture images of visual content. The camera devices may be still action camera devices that capture a single frame of visual content or may be video camera devices that capture a sequence of frames of visual content.

BRIEF SUMMARY

A method includes identifying, via an image processing module, an object located within an image foreground relative to image content within a field of view of at least one camera lens as an image obstruction; determining, responsive to identifying the image obstruction, a plurality of points of view of the at least one camera lens that provide a plurality of image content portions of the image content that in combination yield a complete image of the image content without the image obstruction located within the image foreground; combining the plurality of image content portions to yield the complete image of the image content without the image obstruction located within the foreground; and storing the combined complete image to a memory.

A system includes a memory and a processor programmed to identify an object located within an image foreground relative to image content within a field of view of at least one camera lens as an image obstruction; determine, responsive to identifying the image obstruction, a plurality of points of view of the at least one camera lens that provide a plurality of image content portions of the image content that in combination yield a complete image of the image content without the image obstruction located within the image foreground; combine the plurality of image content portions to yield the complete image of the image content without the image obstruction located within the foreground; and store the combined complete image to the memory.

A computer program product includes a computer readable storage medium including computer readable program code, where the computer readable program code when executed on a computer causes the computer to identify an object located within an image foreground relative to image content within a field of view of at least one camera lens as an image obstruction; determine, responsive to identifying the image obstruction, a plurality of points of view of the at least one camera lens that provide a plurality of image content portions of the image content that in combination yield a complete image of the image content without the image obstruction located within the image foreground; combine the plurality of image content portions to yield the complete image of the image content without the image obstruction located within the foreground; and store the combined complete image to a memory.

BRIEF DESCRIPTION OF THE SEVERAL VIEWS OF THE DRAWINGS

FIG. 5 is a two-dimensional front view of an example of an implementation of image content for three-dimensional image capture regions of FIG. 3 and FIG. 4 according to an embodiment of the present subject matter;

FIG. 6 is a first registered two-dimensional front view overlay of an example of an implementation of combined image content from the two-dimensional front view of FIG. 5 according to an embodiment of the present subject matter;

DETAILED DESCRIPTION

Figure 1:
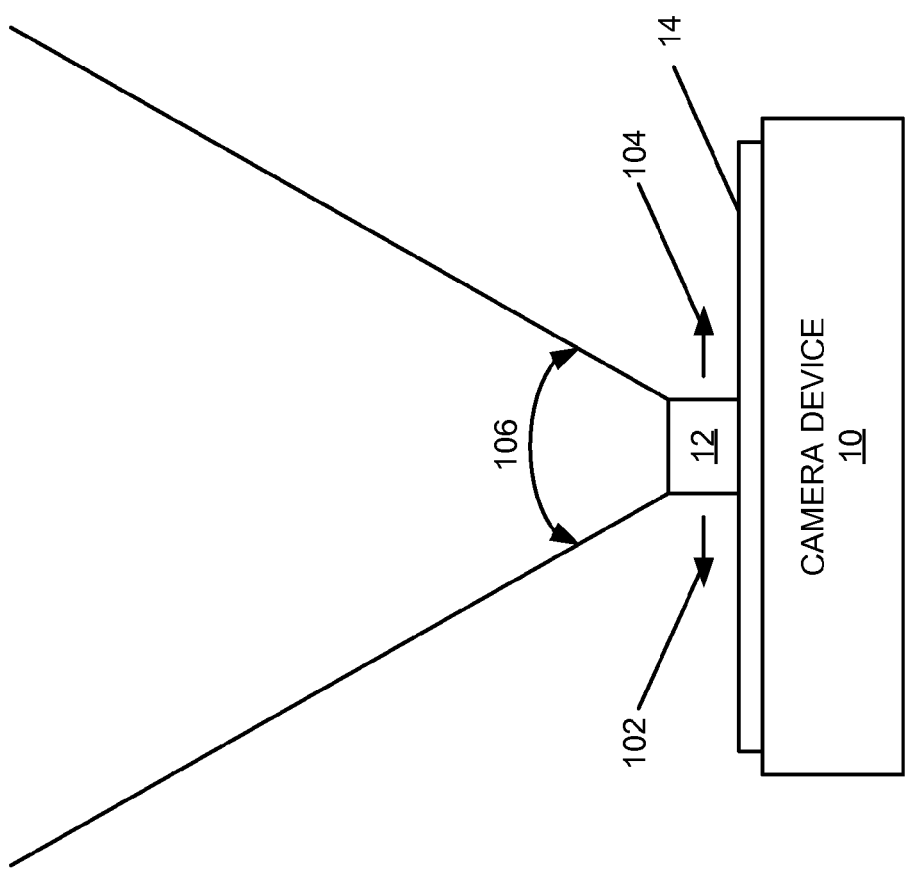
FIG. 1 is a two-dimensional top view of an example of an implementation of a camera device that is capable of providing automated visual obstruction removal with image capture using a single lens shown within an environment according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides visual obstruction removal with image capture. The visual obstruction removal with image capture described herein facilitates removal of minor obstructions in visual media (e.g., photographs, video, etc.) during capture (i.e., in real time) of an image to storage with a photographic device, such as a digital still or video camera device or other device that captures images (collectively hereinafter "camera device"). One or more lenses may be used. Tracks may be provided on the camera device body for single or multiple lens implementations with automated lens movement control to achieve different horizontal and/or vertical points of view (POV) with the lens(es) to allow the lens(es) to obtain exposure of image content behind (e.g., to "see around") the obstruction. Alternatively or additionally, user audio and/or visual prompts may be issued to instruct a user to move the camera device to obtain multiple points of view. The different points of view are utilized to provide different portions of image content behind the obstruction, including portions of the image content that cannot be provided from other points of view. These image content portions are combined to form a complete image without the obstruction in the foreground and the resulting combined complete image is captured to storage as an original captured image of the content. As such, obstructions may be filtered from visual scenes in an automated manner prior to image capture and storage within a camera device.

For purposes of the present subject matter, the terms "obstruction" and "obstacle" may be used interchangeably, and may be considered as any object that may interfere with the desired focal point of the visual media to be captured by a camera device. For example, an obstruction or an obstacle may include items like telephone and/or power poles, telephone and/or power wires, roadway guard rails, fence poles, wires and/or mesh fences, tree branches, screens, etc.

A use case example may include filming video or taking photographs of a baseball game through the wire fencing surrounding the baseball event. In such a situation, moving a camera device close enough to get the camera lens through the fence gaps may result in clipping of much of the desired image content.

As such, during image capture, an object located within an image foreground relative to other image content within a field of view of the lens(es) may be identified as an image obstruction. An image may be identified as an obstruction in a variety of ways. For example, an image may be identified as an obstruction either automatically using image recognition of previously-identified and categorized obstructions or via user indication such as via touchscreen contact with a portion of a preview image.

Additionally, automated image obstruction recognition may utilize distance calculation techniques and characteristics for determining distances of objects from a camera lens using pixel or other characteristics of images. For example, distance-based pixel mapping technologies such as stereopsis may be used to determine distances of objects from a camera lens. Using stereopsis-based processing, image content from multiple points of view as described herein may be overlayed and analyzed. Objects at different distances may be shifted by different amounts in the overlayed image content. Different pixel spacings of different objects may be used to determine relative distances. These relative distances may be used to determine ranges of exclusion or ranges of inclusion for image obstruction removal as described in more detail below.

Another example of a distance calculation technology that may be used to determine distances of objects from a camera lens using multiple points of view as described herein include epipolar geometry. As described above and in more detail below, lenses may be mounted on a track relative to an axis. The lenses may be moved along the axis to gain increasingly accurate distance estimates of objects from the multiple points of view. Additionally, an object in the distance may be selected on an image preview screen (e.g., touchscreen) and a measurement may be input by a user from which the estimated relative distances of other objects may be converted to absolute distances.

Other distance calculation methods may include use of electronic distance measurement (EDM) or optical range finders, ultrasonic sound wave processing, or other distance calculation technology presently available or available in the future. These technologies for performing distance determinations and calculating distances shall be referred to below collectively as "distance calculation processing" for brevity. However, it is understood that use of the phrase distance calculation processing below includes use of one or more of these distance determination technologies, either alone or in combination, to perform range determinations for obstruction removal as described herein.

As described in more detail below, distance ranges of inclusion and/or exclusion may be utilized to filter objects from captured images within a distance range of inclusion and/or exclusion, respectively, using the relative distances determined using distance calculation processing. Image obstruction identification may also be implemented by providing a touchscreen display device with a camera device. In such an implementation, an object may be identified as an obstruction in response to detection of a user contact (e.g., touch) of a position or area on the touchscreen display that represents the position of the object. A boundary of an image that is at least partially represented within the area of the display surface may be identified and an image area within the boundary of the image may be identified as the image obstruction. For example, while viewing a touchscreen output of image content that is available for capture, a user may touch a portion of a fence, a pole, or any other object that is to be categorized as an obstruction. This screen contact may be detected by the camera device to invoke obstruction removal processing. Image obstruction identification may further include shape recognition, color and/or text recognition (e.g., for signs), and/or any other form of image recognition technology appropriate for a given implementation. Such image detection/recognition techniques provide capabilities for filtering objects from captured images in real time during image capture.

Newly-identified obstructions within any image capture session may be stored and a database of obstruction images may be built and refined over time. This database of obstructions may be used for subsequent obstruction image recognition. Intelligent obstruction image updates may be performed in response to obstruction identification as objects are configured/tagged as obstructions. The database of objects may be ranked and prioritized for removal in response to repeated user selections of similar categories of objects (e.g., signs), such that if multiple obstructions are present and removal of all obstructions is not possible for any given single frame of image content, the obstruction with a higher removal ranking may be prioritized for removal. A user prompt may be generated to inform the user of a decision of the camera device to prioritize between two obstructions and a resulting image may be output to a display of the camera device. The user may respond to the prompt to confirm the automated determination or to request override of the obstruction filtering decision made by the camera device based upon the relative removal priorities of competing obstructions within a given scene of image content.

With one or more obstructions identified within a scene of image content to be captured, different points of view (POV) of the lens(es) are determined that provide a set of image content portions of the image content that in combination yield a complete image of the image content without the image obstruction located within the image foreground. The set of image content portions are combined to yield the complete image of the image content without the image obstruction located within the foreground. The combined complete image is captured to storage.

As such, the camera device coordinates the lens(es) positioning during image capture to obtain the focal point object(s) without the identified obstruction by changing the point of view of the lenses to result in multiple lines of sight (e.g., line of sight angles) around the obstruction. This processing may further be augmented by use of a specified desired focal range for object inclusion and/or exclusion as described in more detail below.

A single lens implementation may be considered to address dynamic removal of an obstruction that is not overlapping the focal point or where an image may be somewhat still. A multiple lens implementation may be considered to address obstruction removal where the obstruction overlaps a focal point in action or where the capture is otherwise sensitive to photographic shot timing.

Audio and/or visual feedback may be provided to the user in response to the object detection. For example, a name of the identified obstruction (e.g., telephone pole) may be output via an audio system of the camera device. Alternatively or additionally, the identified obstruction may be highlighted, outlined, named with text on the display screen, or other output may be generated for confirmation. The user may be prompted by either audio feedback or by visual feedback via a user interface of the camera device to confirm the object identification as an obstruction and removal of the object from a subsequently captured image.

Obstruction range detection may be implemented by identifying an inclusive distance range as a focal point/range for image capture activities. For purposes of the present description, objects outside of an inclusive distance range may be excluded from a captured image. Inclusive distance ranges may be determined using distance calculation processing techniques as described above and in more detail below. For example, the camera device may be configured for an inclusive range of twenty (20) to one hundred and fifty (150) meters. Objects outside of this inclusive distance range may be considered and categorized as obstructions, and removed/excluded from captured images.

Alternatively, obstruction range detection may be implemented by identifying an exclusive distance range, where objects within that exclusive range are removed/excluded and the focal point/range for image capture activities is outside of this exclusive range. Exclusive distance ranges may be determined using distance calculation processing techniques as described above and in more detail below. For example, an exclusive range may be configured to exclude objects within a region or range of distance(s). For example, any object within a distance range of ten (10) meters or any object within a distance range between twenty (20) meters and thirty (30) meters may be considered and categorized as an obstruction, and removed from captured images.

As such, each of an inclusive distance range and an exclusive distance range may be used to define/configure distance ranges of exclusion for image content capture. Many other variations on obstruction range detection and configuration of distance ranges of exclusion are possible and all are considered within the scope of the present subject matter.

As described above, object detection may also be implemented in a variety of ways. For example, image recognition may be used to perform the removal of identified obstructions. Alternatively, distance calculation processing or similar technology may be used to allow objects that are not within a specified range to be identified as obstructions and removed from captured images. Lens line of sight optimization may be used to determine whether the camera device has appropriate line of sight angles around the identified obstruction(s) within the applicable exclusive/inclusive distance range definition. Horizontal and/or vertical automated lens movement may be implemented to define the different line of sight angles. Audio and/or video user prompts may also be utilized to instruct the user to move the camera device in one or more directions to improve line of sight angles. User feedback may be provided when one or more sufficient line of sight angles is achieved and one or more image portions may be captured. Multiple iterations of user instructions and line of sight angle determination and image portion capture may be performed to capture all image content portions where the size of a particular obstruction results in movement of the actual camera device to capture all image portions.

Combination of the image content portions may be performed for example by use of image registration techniques. Image registration may utilize identified points that are common within multiple image portions to allow alignment of the content portions to form the single combined complete image. Image content portions that overlap may be cropped from one or more of the image content portions or may be overlaid to provide further registration based upon colors, shapes, etc.

Lens line of sight optimization may be performed to ensure that a line of sight around objects exists. One or more lenses on tracks may be used to allow movement of the lens(es) on some scale so that different points of view may be established. Granularity of automated lens movement may be based upon the particular obstruction to be removed from a captured image. It is understood that moderate lens movement may provide considerable variation in a point of view/line of sight angle based upon the distance to a particular obstruction and the size of the particular obstruction.

A lens controller module may control automated lens positioning. An image processing module may interpret feedback of image content from one or more lenses of an obstruction and analyze the input currently being received from the lens(es). If the combined feedback from all lens positions does not result in a modified visual image without the obstruction, the image processing module may control the lens controller module to make further adjustments to the position(s) or planned position(s) of the lens(es) until the obstruction may be removed from a resulting captured image. This operation may also be iteratively performed in a situation where the camera device is being moved by the operator. The image processing module and the lens controller module may be combined as appropriate for a given implementation. Registration techniques as described above may be implemented to align image content portions. As such, the present subject matter provides for intelligently and automatically moving lines of sight of one or more camera lenses around an object.

Image content filtering and processing may be utilized to match images to obstruction(s) identified by a user or any object not within a configured distance range. After the objects/ranges are identified, and the lens(es) shooting position(s) are adjusted, the visual stream from all lens positions may be concatenated both on the display screen of the camera device for user feedback and within the images captured to storage. As such, a user may be provided with visual feedback, prior to image capture, that the obstructions may be adequately removed. The user may also review the stored (e.g., captured) image for further confirmation of the obstruction removal. This may be accomplished, for example, by processing the image stream from each lens point of view, removing the obstructions from the respective image streams, and filling in the gaps with the information for those locations from the other image streams.

Different users may prefer to categorize different objects as "obstructions" and these categorizations may change over time. Image omission profiles may be configured for each user of a camera device to accommodate these dynamic uses of the visual obstruction removal with image capture described herein. For example, some camera device users may like scenic photographs with rustic fences but without telephone poles and signs, while other users may prefer to omit a safety fence for effect but show a sign that indicates their elevation during a mountain climb. For example, each user may configure an image omission profile and change that image omission profile dynamically to apply to photographs or video that the particular user captures to storage using a particular camera device during a particular time period or geographic location. Accordingly, the real-time obstruction filtering described herein may be adjusted for each user and the image omission profiles may be configured for vacations, work, or other factors, either independently or in combination.

The visual obstruction removal with image capture described herein may be performed in real time to allow prompt removal of obstructions from image content to be captured to a camera device. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

It should be noted that several of the figures described below are represented as two-dimensional views for ease of description purposes. It is also understood that several of the regions identified within the respective figures represent three-dimensional regions (e.g., fields of view of a camera lens), and that these fields of view may form three-dimensional trapezoids or other shapes as appropriate for a given lens configuration and implementation. The examples below utilize region identifiers relative to one or more edges of the respective regions for ease of description and illustration purposes. However, it is understood that the full three-dimensional region is referenced by any such region identifiers. The images within the following figures are not drawn to any particular scale and may be modified as appropriate for any particular implementation.

FIG. 1 is a two-dimensional top view of an example of an implementation of a camera device 10 that is capable of providing automated visual obstruction removal with image capture using a single lens shown within an environment 100. The camera device 10 includes a lens 12 coupled to a track 14 that allows the lens 12 to be moved left and right along the track 14 as represented by an arrow 102 and an arrow 104, respectively. The lens 12 may be moved along the track 14 via one or more servo motors (not shown) or other mechanism as appropriate for a given implementation under the control of a lens controller module of the camera device 10 (see FIG. 9 below). Movement of the lens 12 allows the camera device 10 to capture different points of view (POV) of an image to be captured. The multiple points of view allow the camera device 10 to implement the automated visual obstruction removal with image capture described herein in real time during image capture via the camera device 10.

The lens 12 provides a field of view 106 that is defined by optical characteristics of the lens 12. However, it should be noted that the field of view 106 is for purposes of example and that a field of view of any particular lens may vary from other lenses. As such, the present subject matter may be applied to lenses with different fields of view without departure from the scope of the present subject matter.

As the lens 12 is moved by the camera device 10 along the track 14, as represented by the arrow 102 and the arrow 104, the field of view 106 moves as well, again as defined by the optical characteristics of the lens 12. As described above and in more detail below, this movement of the field of view 106 of the lens 12 provides different points of view for photographic imaging by the camera device 10.

It should be noted that the track 14 may be configured to additionally or alternatively allow vertical or diagonal motion (not shown for ease of illustration purposes) of the lens 12 or multiple lenses as appropriate for a given implementation. The track 14 may also be arced to provide additional perspective to different points of view of the lens 12 and to provide relative equivalent distance to image content from the different points of view as appropriate for a given implementation. It should be noted that additional lenses may be provided as attachments that allow configurability of the camera device 10 to be changed or camera devices may be configured with multiple lenses during manufacturing as appropriate for a given implementation.

It should be noted that the example camera device 10 includes only one lens 12 for ease of illustration purposes. However, multiple lenses may be provided that may each be controlled by the camera device 10 to concurrently capture multiple points of view. As described above, a single lens implementation may be considered to address dynamic removal of an obstruction that is not overlapping the focal point or where an image may be somewhat still. A multiple lens implementation may be considered to address obstruction removal where the obstruction overlaps a focal point in action or where the capture is otherwise sensitive to photographic shot timing.

Figure 2:
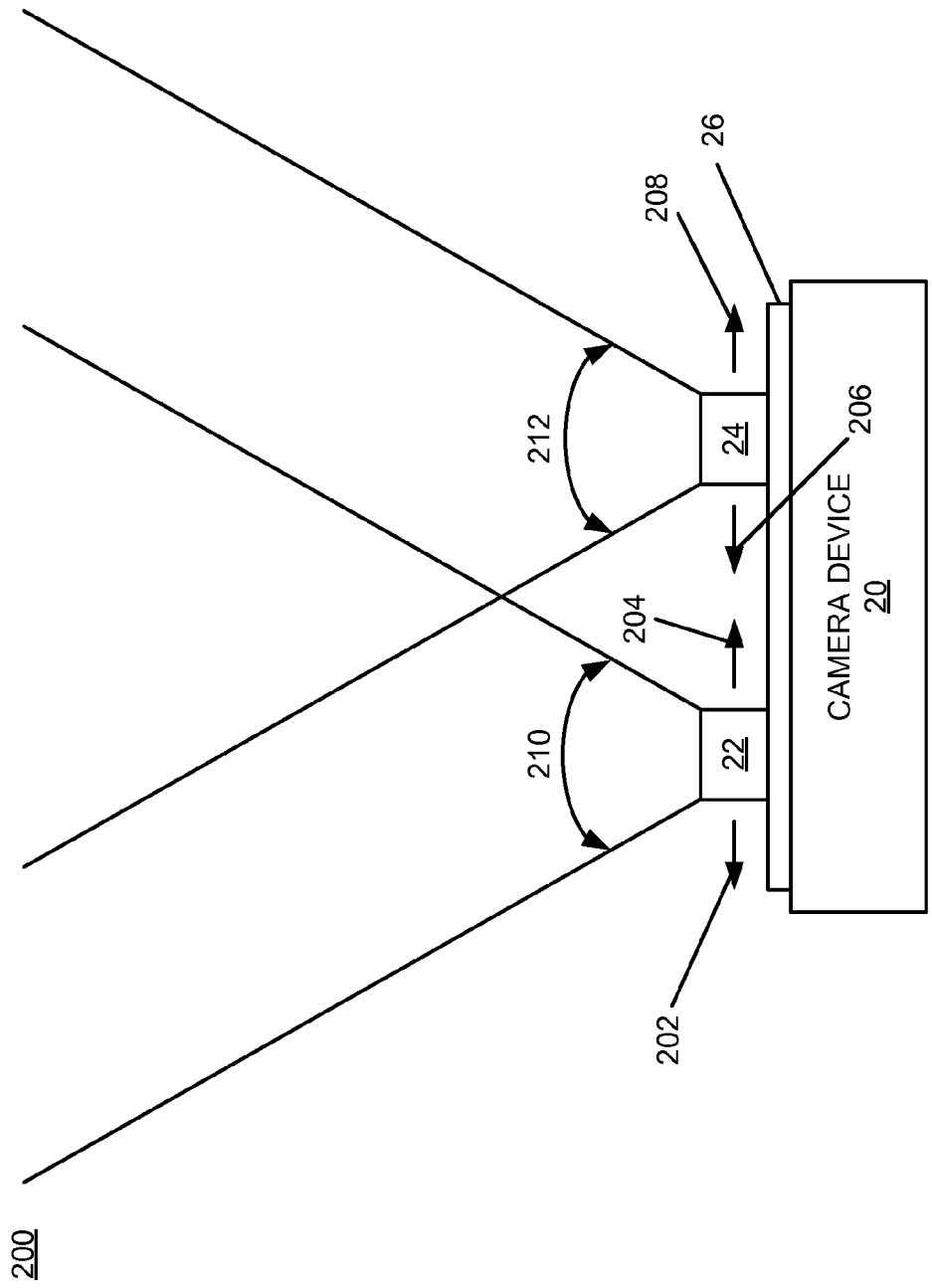
FIG. 2 is a two-dimensional top view of an example of an implementation of a camera device that is capable of providing automated visual obstruction removal with image capture using multiple lenses within an environment according to an embodiment of the present subject matter.

FIG. 2 is a two-dimensional top view of an example of an implementation of a camera device 20 that is capable of providing automated visual obstruction removal with image capture using multiple lenses within an environment 200. A camera device 20 is shown within the environment 200. The camera 20 includes a lens 22 and a lens 24 each coupled to a track 26 that allows the lens 22 and the lens 24 to each be independently moved left and right along the track as represented by an arrow 202 and an arrow 204, and an arrow 206 and an arrow 208, respectively. The lens 22 and the lens 24 may be moved along the track 26 via one or more servo motors (not shown) or other mechanism as appropriate for a given implementation under the control of a lens controller module of the camera device 20 (see FIG. 9 below). Movement of the lens 22 and the lens 24 allows the camera device 20 to concurrently/simultaneously capture different points of view (POV) of an image to be captured. The multiple points of view allow the camera device 20 to implement the automated visual obstruction removal with image capture described herein in real time during image capture via the camera device 20.

The lens 22 and the lens 24 each provide a field of view 210 and a field of view 212, respectively, that are each defined by optical characteristics of the lens 22 and the lens 24. However, it should be noted that the field of view 210 and the field of view 212 are for purposes of example and that the field of view of any particular lens may vary from other lenses, or from the fields of view of each of multiple lenses coupled to the same camera. As such, the present subject matter may be applied to lenses with different fields of view without departure from the scope of the present subject matter.

As the lens 22 and the lens 24 are moved by the camera device 20 along the track 26, as represented by the arrows 202 and 204 and the arrows 206 and 208, respectively, the field of view 210 and the field of view 212 move as well, again as defined by the optical characteristics of the lens 22 and the lens 24. As described above and in more detail below, this movement of the field of view 210 of the lens 22 and the field of view 212 of the lens 24 provides different points of view for photographic imaging by the camera device 20.

It should be noted that the track 26 may be configured to additionally or alternatively allow vertical or diagonal motion (not shown for ease of illustration purposes) of the lens 22 and/or the lens 24 as appropriate for a given implementation. The track 26 may also be arced to provide additional perspective to different points of view of the lens 22 and the lens 24, and to provide relative equivalent distance to image content from the different points of view as appropriate for a given implementation. Further, the track 26 may be configured as two independently operating tracks as appropriate for a given implementation. It should be noted that additional lenses may be provided as attachments that allow configurability of the camera device 20 to be changed or camera devices may be configured with additional lenses during manufacturing as appropriate for a given implementation.

As described above and in more detail below, image registration techniques may be used to provide visual image registration of multiple portions of image content obtained from the multiple points of view during combination of the multiple portions of image content into each single captured frame to remove image obstructions from a foreground relative to image content within a field(s) of view of the camera lens(es). Many possibilities exist for image obstruction removal from captured image content based upon the visual obstruction removal with image capture described herein and all are considered within the scope of the present subject matter.

Figure 3:
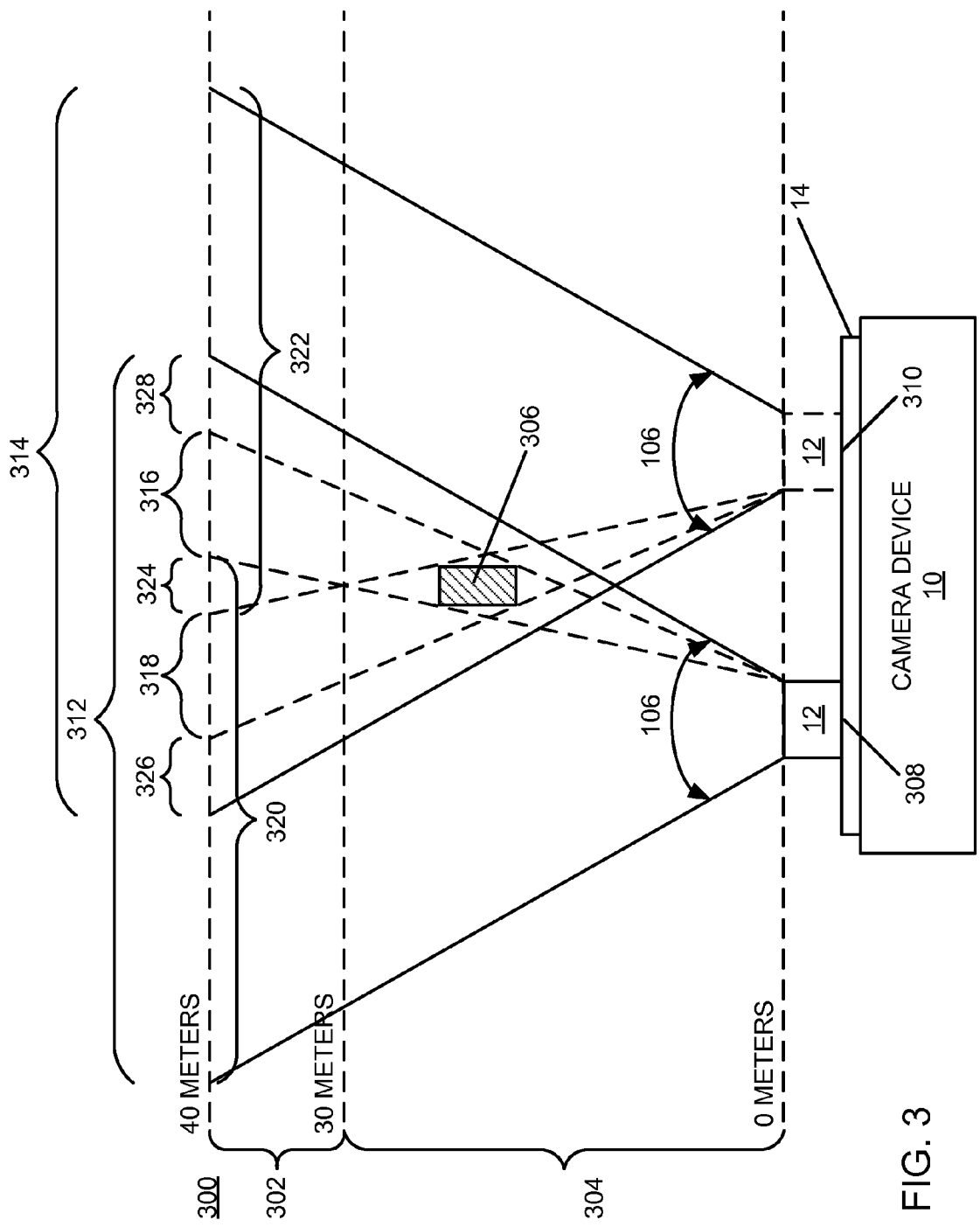
FIG. 3 is a two-dimensional top view of an example of an implementation of the camera device of FIG. 1 that is capable of providing automated visual obstruction removal with image capture using a single lens and that shows additional detail regarding obstruction identification and removal within an environment according to an embodiment of the present subject matter.

FIG. 3 is two-dimensional top view of an example of an implementation of the camera device 10 of FIG. 1 that is capable of providing automated visual obstruction removal with image capture using a single lens and that shows additional detail regarding obstruction identification and removal within an environment 300. For purposes of the present example, the camera device 10 is utilized for brevity. However, it is understood that the present description applies to multiple-lens camera devices, such as the camera device 20 of FIG. 2, without departure from the scope of the present subject matter.

The environment 300 includes an inclusive distance range 302 as a focal point/range for image capture activities. It should be noted that an exclusive distance range 304 is also shown relative to a front surface of the lens 12 of the camera device 10. The exclusive distance range 304 defines a region outside of a focal point/range for image capture activities. It is understood that a camera device, such as the camera device 10, may convert between inclusive and exclusive distance ranges as appropriate for a given implementation and configuration. As such, only one of an inclusive or exclusive distance range may be used as appropriate for a given implementation. Further, only the inclusive distance range 302 and the exclusive distance range 304 are shown for ease of description. However, it is understood that multiple inclusive or exclusive distance ranges may be defined without departure from the scope of the present subject matter.

The inclusive distance range 302 is shown to be configured between thirty (30) and forty (40) meters. The exclusive distance range 304 is shown to be configured between zero (0) and thirty (30) meters. As such, objects within the inclusive distance range 302 may be configured for image capture, while objects within the exclusive distance range 302 may be removed from captured images by use of relative distance determination using the distance calculation processing or other similar pixel processing or ranging techniques.

An image obstruction 306 is shown within each of the field of view 106 of the lens 12 even with the lens 12 in each of a position 308 and a position 310 along the track 14. The lens 12 is depicted with a dashed-line representation at the position 310 to show that it has been moved from the position 308 to the position 310, or vice versa, to obtain multiple image content portions for combination and removal of the image obstruction 306.

The image obstruction 306 may be identified, as described above and in more detail below, by its location within the exclusive distance range 304 (or by its location outside of the inclusive distance range 302). Further, the image obstruction 306 may be identified in response to touchscreen display device input to the camera device 10. Image recognition processing may also be used to identify the image obstruction 306 as an unwanted object within a frame of image content (e.g., such as a telephone pole) to be removed from a captured image. Many possibilities exist for identifying an object as an obstruction, such as the image obstruction 306, and all are considered within the scope of the present subject matter.

As can be seen from FIG. 3, the image obstruction 306 blocks a portion of a complete view of an image capture region 312 by the lens 12 at the lens position 308 within a three-dimensional focal region between thirty (30) and forty (40) meters. As described above, it is understood that the image capture region 312 is a region identifier that represents a three dimensional region within this distance range and appears as a trapezoid outlined by dashed lines at thirty (30) and forty (40) meters bounded on the sides by solid lines representing the field of view 106 at lens position 308. The image capture region 312 is identified relative to the dashed line at forty (40) meters within FIG. 3 for ease of illustration purposes. Similar region identifiers are used within the description below and it is understood that several of these region identifiers also reference to similar three dimensional regions. Repetition of the detail relative to the image capture region 312 is omitted for brevity within the following region descriptions.

The image obstruction 306 also blocks a portion of a complete view of an image capture region 314 by the lens 12 at the lens position 310 within a three-dimensional focal region between thirty (30) and forty (40) meters. For example, a blocked region 316 is not visible by the lens 12 in the position 308. Similarly, a blocked region 318 is not visible by the lens 12 in the position 310. However, these blocked regions 316 and 318 are visible within the field of view 106 by a line of sight angle of the lens 12 at the positions 310 and 308, as shown by a image region 320 and a image region 322, respectively. As such, the camera device 10 may capture multiple portions of the three-dimensional focal region between thirty (30) and forty (40) meters via the different points of view obtained from the lens positions 308 and 310, and remove the image obstruction 306 from a combined captured image.

For purposes of the present description, an "image region" and an "image capture region" as used herein represent optical image focal areas of a lens from which at least one "image content portion" may be obtained. As described above and in more detail below, image content portions may be combined to yield the complete image of the image content without an image obstruction located within the foreground in response to determining multiple points of view of at least one camera lens that provide the image content portions. This combined image may be captured and stored without the image obstruction located within the foreground.

It should also be noted, however, that the present example is for purposes of illustration and is of reduced complexity for ease of illustration. As such, though the present example depicts a situation where an image obstruction may be removed from a captured image with movement of the single lens 12 of the camera 10, it should be understood that a camera device, such as the camera device 20, with multiple lenses may be used and automated movement of the lenses 22 and 24 may be used to achieve different points of view from their respective positions to remove image obstructions of different shapes, sizes, and distances from the camera lenses 22 and 24. Further, the lenses 22 and 24 may be positioned at locations such as the position 308 and the position 310 to achieve similar processing results.

It should further be noted that an overlap region 324 exists within the present example between the blocked region 316 and the blocked region 318. This overlap region 324 results in some image content overlap from the image content portions obtainable from the lens 12 in each of the positions 308 and 310. Though this overlap is not necessary to capture a complete image without the image obstruction 306, this overlap may assist with image portion registration. An overlap region 326 and an overlap region 328 may also be used for image portion content registration. As such, an image content portion overlap, such as the overlap region 324, may be used as appropriate for a given implementation for purposes of efficiency improvement. Such an image registration overlap region 324 may be configurable for a camera device, such as the camera device 10 or the camera device 20, and may be made selectable within or via an image omission profile or other configuration setting. It is also understood that other portions of image content within multiple fields of view on opposite sides of an obstruction may be used for image registration purposes without departure from the scope of the present subject matter.

Figure 4:
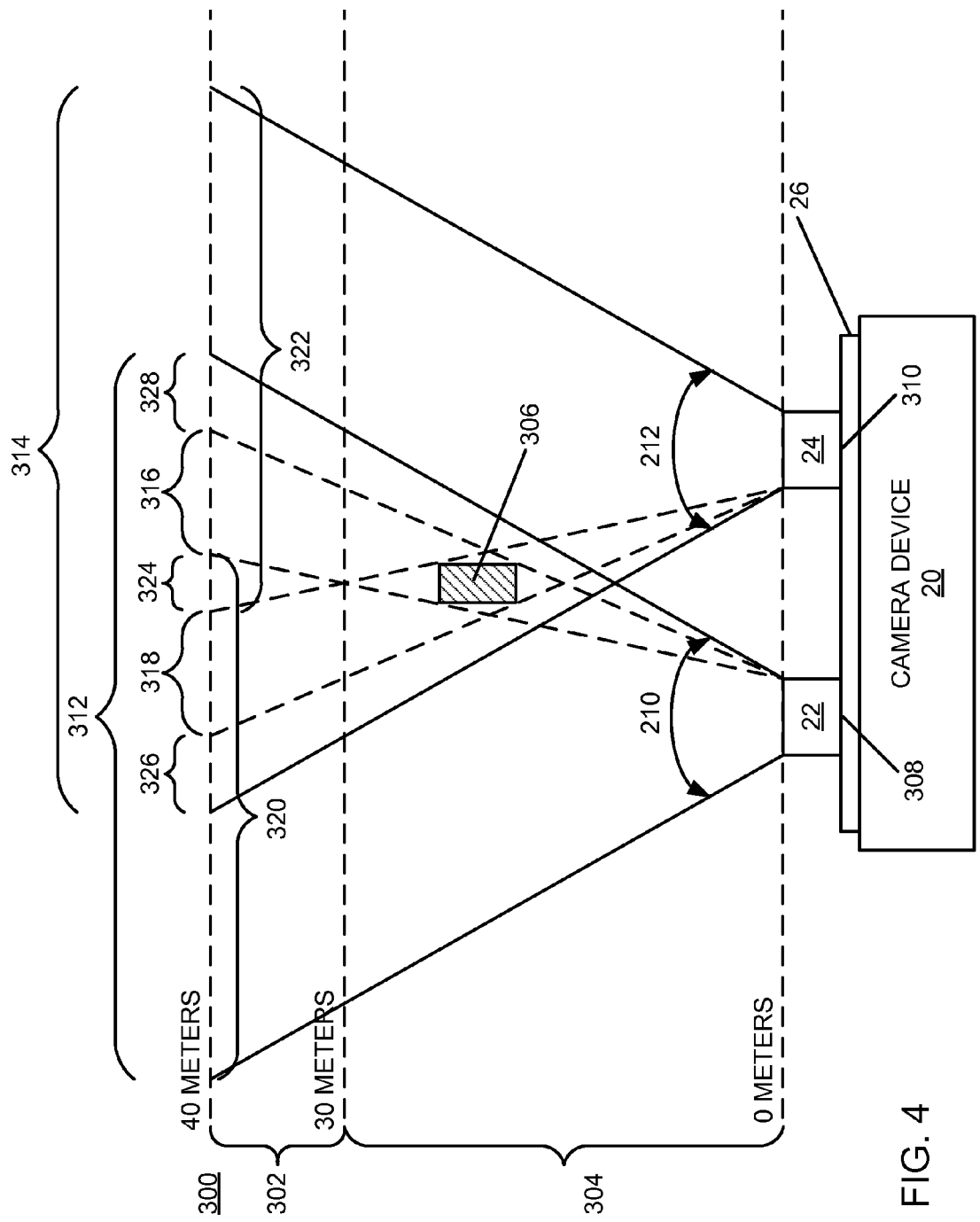
FIG. 4 is a two-dimensional top view of an example of an implementation of the camera device of FIG. 2 that is capable of providing automated visual obstruction removal with image capture using multiple lenses and that shows additional detail regarding obstruction identification and removal within the environment of FIG. 3 according to an embodiment of the present subject matter.

FIG. 4 is a two-dimensional top view of an example of an implementation of the camera device 20 of FIG. 2 that is capable of providing automated visual obstruction removal with image capture using multiple lenses and that shows additional detail regarding obstruction identification and removal within the environment 300 of FIG. 3. All details within the environment 300 are identical to FIG. 3 above and the description above is incorporated by reference with respect to FIG. 4 for brevity. Use of the camera device 20 within the environment 300 may improve image capture time by use of multiple lenses. For purposes of the present description, it is assumed that the lens 22 has been moved by the camera device 20 along the track 26 to the position 308 and that the lens 24 has been moved by the camera device 20 along the track 26 to the position 310, though other lens positions may be utilized without departure from the scope of the present subject matter. With respect to these example lens positions, a field of view 210 and a field of view 212 are shown relative to the image capture region 312 and the image capture region 314, respectively. The remaining description of FIG. 3 applies at least equally to FIG. 4. As such, the camera device 20 may be used to improve image capture timing/speed by concurrent displacement of the two lenses 22 and 24 along the track 26 to remove the image obstruction 306 from a captured image.

Figure 7:
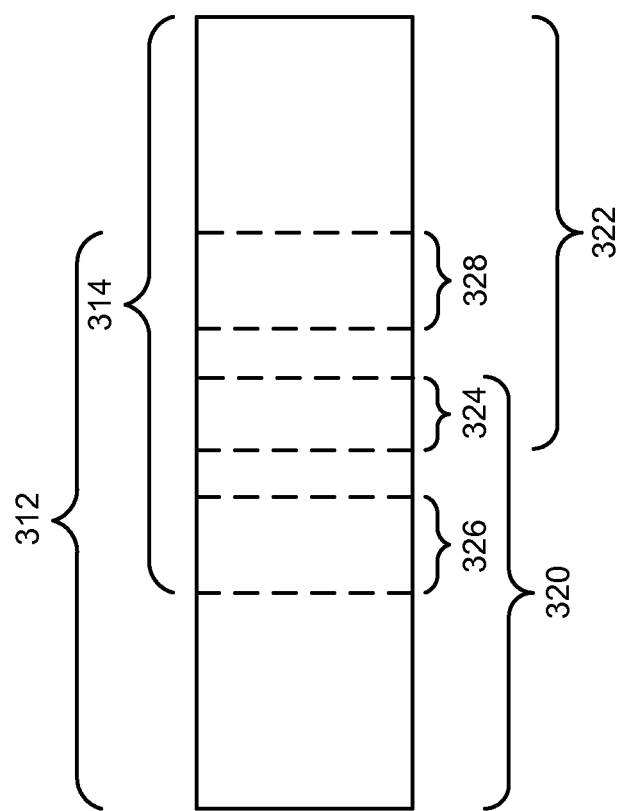
FIG. 7 is a second registered two-dimensional front view overlay of an example of an implementation of combined image content from the two-dimensional front view of FIG. 5 according to an embodiment of the present subject matter.

FIG. 5 through FIG. 7 below describe example image content portions progressing through content capture/storage as described above within FIG. 3 and FIG. 4. For purposes of the present examples, it is assumed that the image obstruction 306 occupied the full vertical image capture field of view of the respective camera lens(es) of the camera device 10 and the camera device 20.

FIG. 5 is a two-dimensional front view of an example of an implementation of image content 500 for the three-dimensional image capture region 312 and the three-dimensional image capture region 314 of FIG. 3 and FIG. 4. The image obstruction 306 is shown to occupy the full vertical image capture field of image capture region 312 and the image capture region 314. The image obstruction 306 is offset within each of the image capture region 312 and the image capture region 314 relative to the respective lens spacing described above. The blocked region 316 and the blocked region 318 are also shown and represent portions of image content within the respective image capture region 312 and the image capture region 314 that is blocked from the respective points of view of the lens(es).

Using certain image content portions of the image capture region 312 and the image capture region 314, a complete representation of the image content within the inclusive distance range 302 of FIG. 3 and FIG. 4 may be obtained. The image region 320 and the image region 322 are shown within each of the image capture region 312 and the image capture region 314, respectively. Several portions of image content may be overlaid and used for final image registration and capture/storage. For example, one or more of the overlap region 324, the overlap region 326, and the overlap region 328 may be used for image content registration of partial image content from each of the respective image capture region 312 and the image capture region 314.

FIG. 6 is a first registered two-dimensional front view overlay of an example of an implementation of combined image content 600 from the two-dimensional front view of FIG. 5. The combined image content 600 forms a line of sight union of certain respective portions of image content from the multiple points of view of the respective lens(es), where certain image content portions have been superimposed for image registration purposes along with other image content portions that represent the remaining image content of the combined image content 600. As can be seen from FIG. 6, the image obstruction 306, the blocked region 316, and the blocked region 318 are no longer present within the combined image content. Further, image content identification of the overlap region 324 provides sufficient visual image content for registering the image region 320 with the image region 322 to form the combined image content 600. As such, only the image region 320 and the image region 322 may be used to form the combined image content 600 that forms the line of sight union of the respective portions of image content from the multiple points of view of the respective lens(es).

FIG. 7 is a second registered two-dimensional front view overlay of an example of an implementation of combined image content 700 from the two-dimensional front view of FIG. 5. The combined image content 700 forms a line of sight union of certain respective portions of image content from the multiple points of view of the respective lens(es), where certain image content portions have been superimposed for image registration purposes along with other image content portions that represent the remaining image content of the combined image content 700. As can also be seen from FIG. 7, the image obstruction 306, the blocked region 316, and the blocked region 318 are no longer present within the combined image content. Further, though image content identification of the overlap region 324 provides sufficient visual image content for registering the image region 320 with the image region 322, additional image content identification of the overlap regions 326 and the overlap region 328 are also used to further enhance image content registration to form the combined image content 700. As such, additional available content other than the image region 320 and the image region 322 may be used to form the combined image content 700 that forms the line of sight union of the respective portions of image content from the multiple points of view of the respective lens(es). It should be understood that many other possibilities exist for automated visual obstruction removal with image capture using one or more lenses and all are considered within the scope of the present subject matter.

Figure 8:
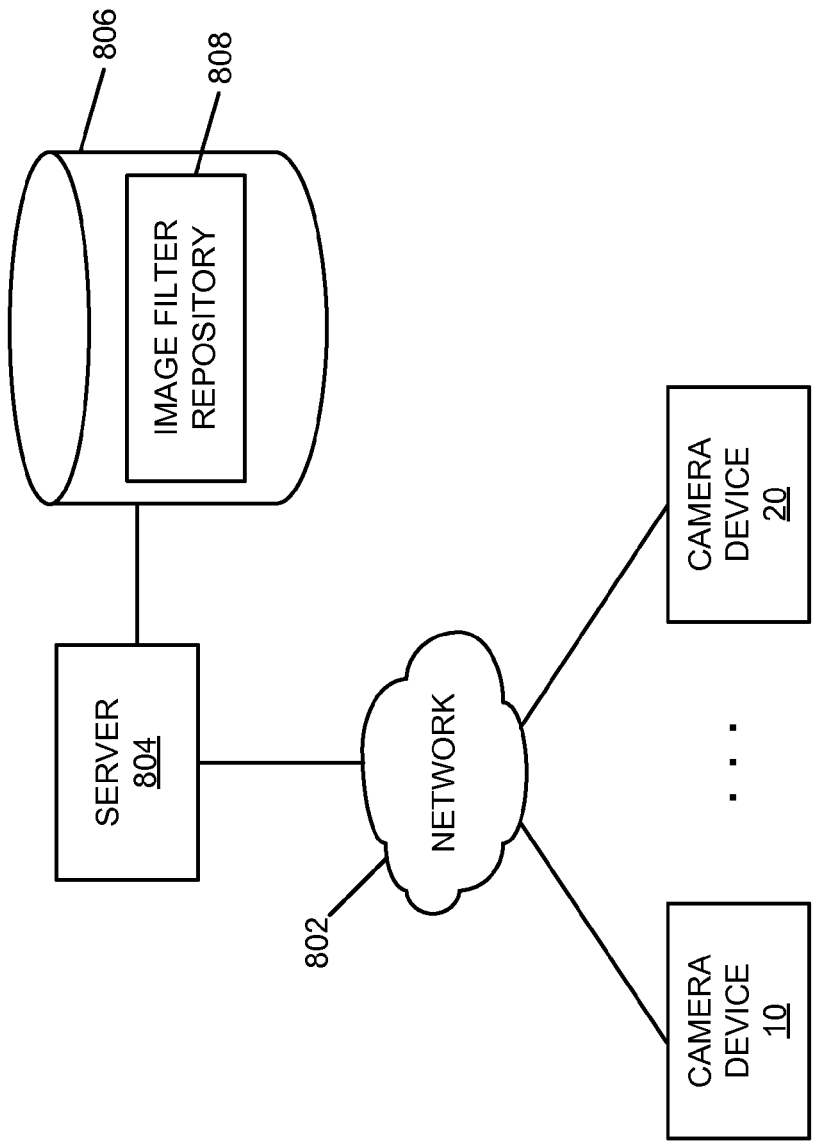
FIG. 8 is a block diagram of an example of an implementation of a system for automated visual obstruction removal with image capture according to an embodiment of the present subject matter.

FIG. 8 is a block diagram of an example of an implementation of a system 800 for automated visual obstruction removal with image capture. The camera device 10 of FIG. 1 through the camera device 20 of FIG. 2 are shown separated by ellipsis dots to make clear that additional camera devices may form a portion of the system 800. The camera device 10 through the camera device 20 are shown to communicate via a network 802 with a server 804. Communication with the server 804 may be via wired or wireless communications as appropriate for a given implementation. For example, the camera device 10 through the camera device 20 may communicate via Bluetooth® wireless communication, Wi-Fi, or other wireless communication, or may communicate via universal serial bus (USB), Ethernet, or other wired communication as appropriate for a given implementation.

The server 804 interfaces with or includes a database 806. The database 806 stores an image filter repository 808. The image filter repository 808 stores image data that may be used to identify obstructions within image content during image capture, as described above and in more detail below. The image filter repository 808 may also store image omission profiles for users of camera devices, such as the camera device 10 through the camera device 20. As such, image omission profiles and image data for identifying obstructions may be shared among camera devices and camera device users. For purposes of the description below, the camera device 10 may be referenced for ease of description purposes. However, it is understand that the description below applies at least equally to each of the camera device 10 through the camera device 20.

The camera device 10 may connect to the server 804 periodically or occasional, or may maintain a connection and communicate with the server in real time as photographic activities progress, to exchange information. Such connection determinations may be based upon availability of a respective connection to the network 802 within a given environment and as appropriate for a given implementation.

As will be described in more detail below in association with FIG. 9 through FIG. 11C, camera devices such as the camera device 10 provide automated visual obstruction removal with image capture. The automated visual obstruction removal with image capture is based upon real-time identification of image obstructions within a field of view of at least one camera lens of camera devices, such as the camera device 10. The automated visual obstruction removal with image capture described herein further provides for determining, via an image processing module responsive to identifying the image obstruction, a plurality of points of view of at least one camera lens that provide a plurality of image content portions of the image content that in combination yield a complete image of the image content without the image obstruction located within the image foreground. The plurality of image content portions are combined to yield the complete image of the image content without the image obstruction located within the foreground and the combined complete image is captured to storage. It should be noted that the captured image may additionally be transmitted via the network 802 in real time without departure from the scope of the present subject matter.

It should be noted that camera devices such as the camera device 10 may be a portable camera device or computing device that includes a camera, either by a user's ability to move the camera device 10 to different locations, or by the camera device 10's association with a portable platform, such as a plane, train, automobile, or other moving vehicle. It should also be noted that the camera device 10 may be any camera or computing device that includes a camera capable of processing information as described above and in more detail below. For example, the camera device 10 may include devices such as a digital still camera, a digital video camera, a personal computer (e.g., desktop, laptop, etc.) with a camera or a handheld device (e.g., cellular telephone, personal digital assistant (PDA), email device, music recording or playback device, etc.) with a camera, or any other device capable of processing information as described above and in more detail below. The camera device 10 may further operate as either or both of a still image camera that captures single frames of video content or a video camera that captures multiple sequential frames of video content. The camera device 10 may utilize an analog photographic medium (e.g., film) without departure from the scope of the present subject matter.

The network 802 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server 804 may include any device capable of providing data for processing by a device, such as the camera device 10 through the camera device 20, via a network, such as the network 802. As such, the server 804 may include any form of data server device.

Figure 9:
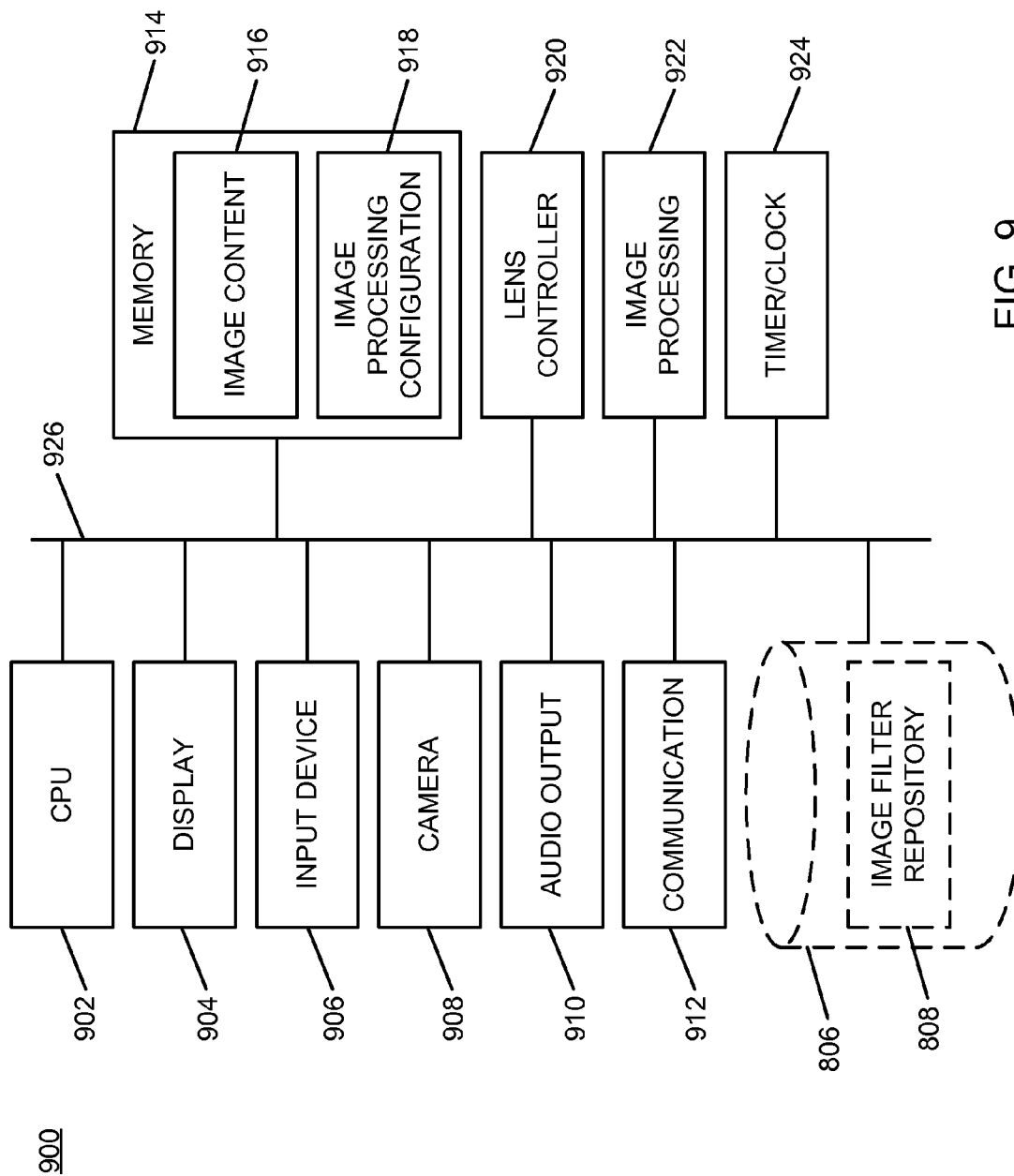
FIG. 9 is a block diagram of an example of an implementation of a core processing module capable of performing automated visual obstruction removal with image capture according to an embodiment of the present subject matter.

FIG. 9 is a block diagram of an example of an implementation of a core processing module 900 capable of performing automated visual obstruction removal with image capture. The core processing module 900 may be associated with either the camera device 10 or the camera device 20, or with other devices, as appropriate for a given implementation. The core processing module 900 is capable of performing automated visual obstruction removal during image capture in real time. A central processing unit (CPU) 902 provides computer instruction execution, computation, and other capabilities within the core processing module 900. A display 904 provides visual information to a user of the core processing module 900 and an input device 906 provides input capabilities for the user.

The display 904 may include any display device, such as a touchscreen display, a cathode ray tube (CRT), liquid crystal display (LCD), light emitting diode (LED), electronic ink displays, projection, touchscreen, or other display element or panel. The input device 906 may include touchscreen input sensors (which may alternatively form a portion of the display device 904 for a touchscreen implementation), an image capture key that indicates a request for image capture, a computer keyboard, a keypad, a mouse, a pen, a joystick, or any other type of input device by which the user may interact with and respond to information on the display 904.

A camera 908 provides image capture capabilities for each lens associated with the core processing module 900, which as described above may include one or more lenses. Image content portions captured by the camera 908 from multiple points of view may be processed as described above and in more detail below to yield a combined complete image of the image content without an image obstruction located within the foreground. The camera 908 may include one or more devices for image capture, such as charge-coupled devices (CCDs), associated with each lens. Image content may be converted to digital form for processing using devices such as CCDs. Other device types for image conversion to digital format for processing may be utilized as appropriate for a given implementation.

An audio output module 910 is also shown. The audio output module may include circuitry and one or more speaker devices for generation of audio output via the core processing module 900. Audio output may be utilized, for example, to prompt a user for input and/or selection of screen areas via touchscreen display contact to identify images as obstructions to be removed from a combined complete image. Audio output may also be utilized to provide audio feedback to a user regarding actions performed by the core processing module 900.

A communication module 912 provides interconnection capabilities that allow the core processing module 900 to communicate with other modules within the system 800, such as the server 804, to archive or obtain image obstruction identifying information, user image omission profile(s), or other communications as appropriate for a given implementation. The communication module 912 may include any electrical, protocol, and protocol conversion capabilities useable to provide the interconnection capabilities. Though the communication module 912 is illustrated as a component-level module for ease of illustration and description purposes, it should be noted that the communication module 912 may include any hardware, programmed processor(s), and memory used to carry out the functions of the communication module 912 as described above and in more detail below. For example, the communication module 912 may include additional controller circuitry in the form of application specific integrated circuits (ASICs), processors, antennas, and/or discrete integrated circuits and components for performing communication and electrical control activities associated with the communication module 912. Additionally, the communication module 912 may include interrupt-level, stack-level, and application-level modules as appropriate. Furthermore, the communication module 912 may include any memory components used for storage, execution, and data processing for performing processing activities associated with the communication module 912. The communication module 912 may also form a portion of other circuitry described without departure from the scope of the present subject matter.

The database 806 including the image filter repository 808 are also shown in association with the core processing module 900. The database 806 and the image filter repository 808 are shown in a dashed-line representation to show that they may be co-located with the core processing module 900 within a camera device, such as the camera device 10, or located in association with a server, such as the server 804, as appropriate for a given implementation.

A memory 914 includes an image content storage area 916 that stores image content, such as combined completed images of image content without the image obstruction located within the foreground. As will be described in more detail below, digital image content from the camera 908, such as image content captured via one or more CCDs associated with one or more lenses may be processed and captured to store combined completed images within the image content storage area 916. Other intermediate processing of image content portions may be performed using the image content storage area 914.

An image processing configuration storage area 918 stores user image omission profiles and other configuration information. The image processing configuration storage area 918 may also store images for image recognition purposes, such as images of telephone and/or power poles, telephone and/or power wires, roadway guard rails, fence poles, wires and/or mesh fences, tree branches, screens, or other image obstructions as described above, that may be filtered from completed captured images.

It is understood that the memory 914 may include any combination of volatile and non-volatile memory suitable for the intended purpose, distributed or localized as appropriate, and may include other memory segments not illustrated within the present example for ease of illustration purposes. For example, the memory 914 may include a code storage area, an operating system storage area, a code execution area, and a data area without departure from the scope of the present subject matter.

A lens controller module 920 may be used to control lens position for one or more lenses along one or more tracks of a camera device, as described above in FIG. 1 and FIG. 2 in association with the camera device 10 and the camera device 20, respectively. As described above, one or more lenses may be moved to multiple points of view to capture image content portions that may be combined during image capture to form a complete image of the image content without an image obstruction located within the foreground. Movement of lenses along tracks mounted to camera devices or otherwise mounted may be performed using servo motors or other mechanical means to allow automated positioning of lenses at multiple points of view.

An image processing module 922 is also illustrated. The image processing module 922 provides image obstruction identification/recognition, image portion identification, image portion registration, image portion combination, image concatenation, and other image processing functions for the core processing module 900, as described above and in more detail below. The image processing module 922 implements the automated visual obstruction removal with image capture of the core processing module 900.

Though the lens controller module 920 and the image processing module 922 are illustrated as component-level modules for ease of illustration and description purposes, it should be noted that these modules may include any hardware, programmed processor(s), and memory used to carry out the functions of these modules as described above and in more detail below. For example, the lens controller module 920 and the image processing module 922 may include additional controller circuitry in the form of application specific integrated circuits (ASICs), processors, and/or discrete integrated circuits and components for performing communication and electrical control activities associated with the respective devices. Additionally, the lens controller module 920 and the image processing module 922 may include interrupt-level, stack-level, and application-level modules as appropriate. Furthermore, the lens controller module 920 and the image processing module 922 may include any memory components used for storage, execution, and data processing for performing processing activities associated with these modules. The image processing module 922 and the lens controller module 920 may also be combined as appropriate for a given implementation.

It should also be noted that the image processing module 922 may form a portion of other circuitry described without departure from the scope of the present subject matter. Further, the image processing module 922 may alternatively be implemented as an application stored within the memory 914. In such an implementation, the image processing module 922 may include instructions executed by the CPU 902 for performing the functionality described herein. The CPU 902 may execute these instructions to provide the processing capabilities described above and in more detail below for the core processing module 900. The image processing module 922 may form a portion of an interrupt service routine (ISR), a portion of an operating system, a portion of a browser application, or a portion of a separate application without departure from the scope of the present subject matter.

A timer/clock module 924 is illustrated and used to determine timing and date information. As such, the image processing module 922 may utilize information derived from the timer/clock module 924 for information processing activities, such as time and date stamping of images associated with the automated visual obstruction removal with image capture.

The CPU 902, the display 904, the input device 906, the camera 908, the audio output 910, the communication module 912, the database 806, the memory 914, the lens controller module 920, the image processing module 922, and timer/clock module 924 are interconnected via an interconnection 926. The interconnection 926 may include a system bus, a network, or any other interconnection capable of providing the respective components with suitable interconnection for the respective purpose.

While the core processing module 900 is illustrated with and has certain components described, other modules and components may be associated with the core processing module 900 without departure from the scope of the present subject matter. Additionally, it should be noted that, while the core processing module 900 is described as a single device for ease of illustration purposes, the components within the core processing module 900 may be co-located or distributed and interconnected via a network without departure from the scope of the present subject matter. For a distributed arrangement, the display 904 and the input device 906 may be located at a point of sale device, kiosk, or other location, while the CPU 902 and memory 914 may be located at a local or remote server. Many other possible arrangements for components of the core processing module 900 are possible and all are considered within the scope of the present subject matter. It should also be understood that, though the image filter repository 808 is shown within the database 806, it may also be stored within the memory 914 without departure from the scope of the present subject matter. Accordingly, the core processing module 900 may take many forms and may be associated with many platforms.

Figure 10:
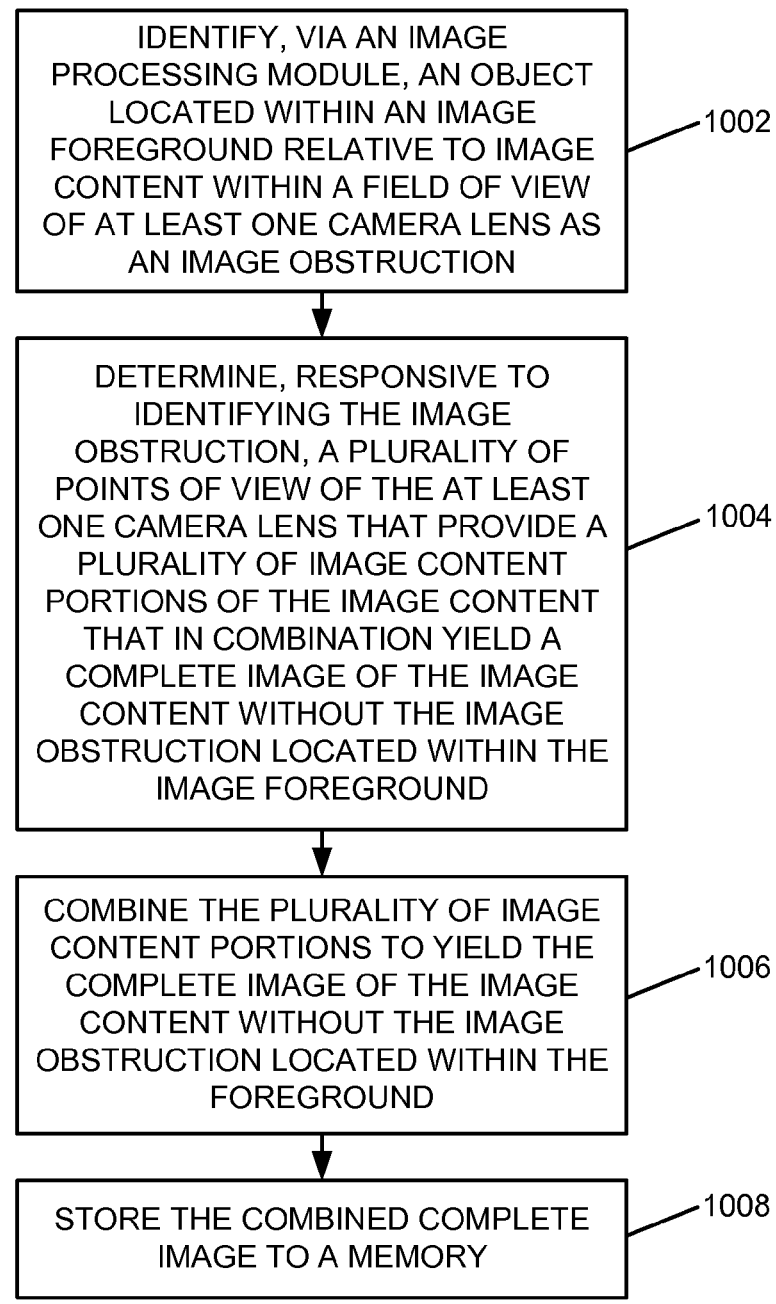
FIG. 10 is a flow chart of an example of an implementation of a process for automated visual obstruction removal with image capture according to an embodiment of the present subject matter.
Figure 11A:
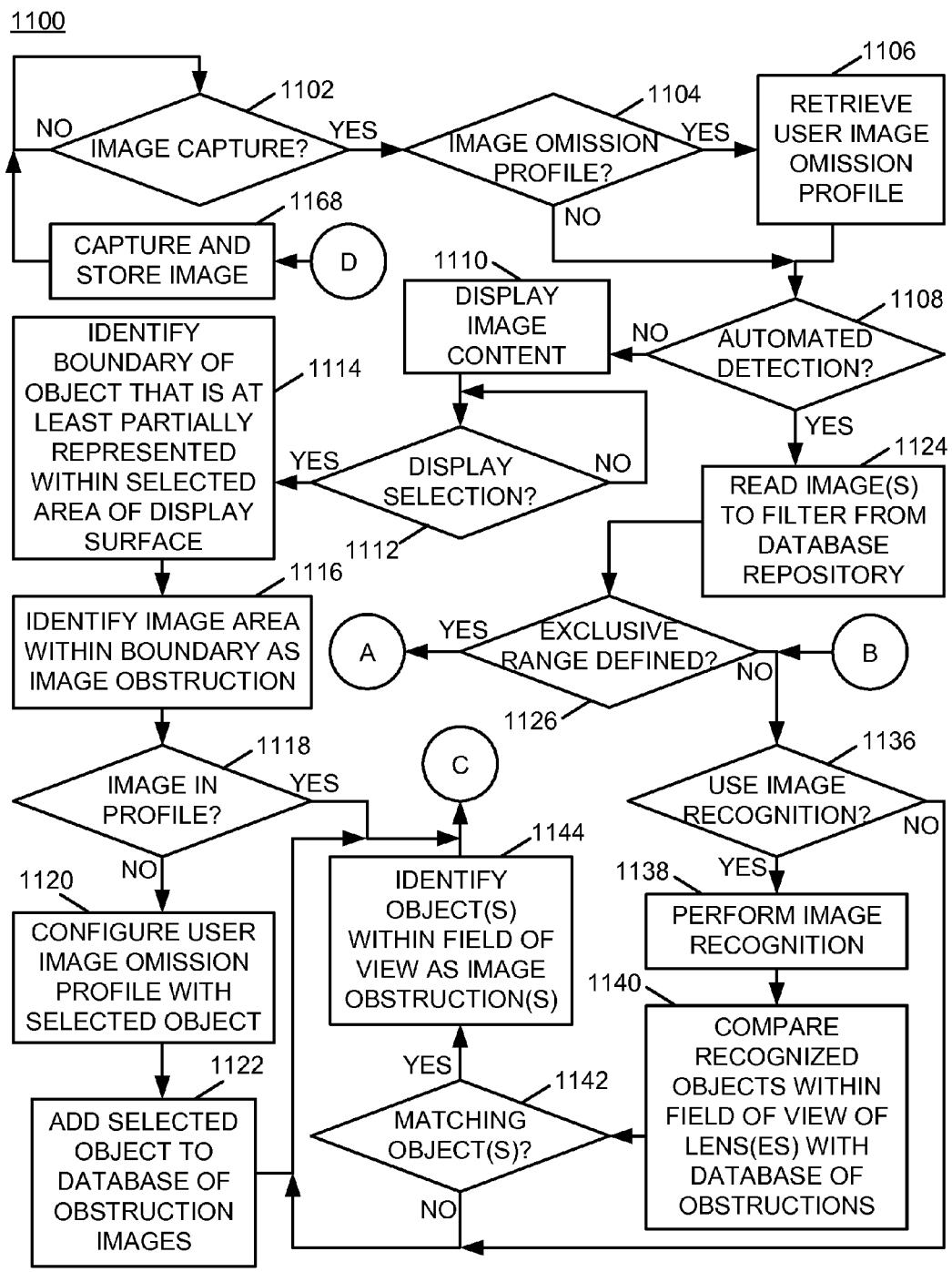
FIG. 11A is a flow chart of an example of an implementation of initial processing of a process for automated visual obstruction removal with image capture according to an embodiment of the present subject matter.
Figure 11B:
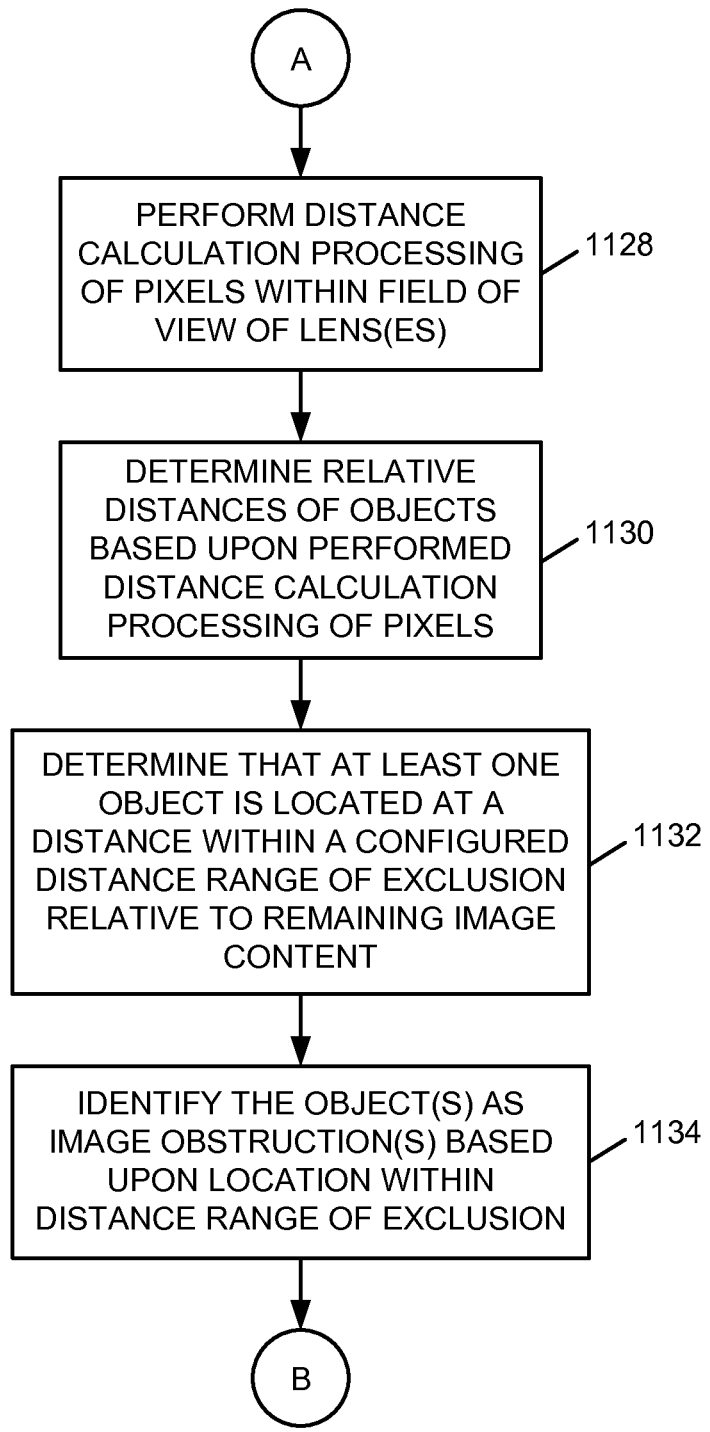
FIG. 11B is a flow chart of an example of an implementation of a first portion of additional processing of a process for automated visual obstruction removal with image capture according to an embodiment of the present subject matter.
Figure 11C:
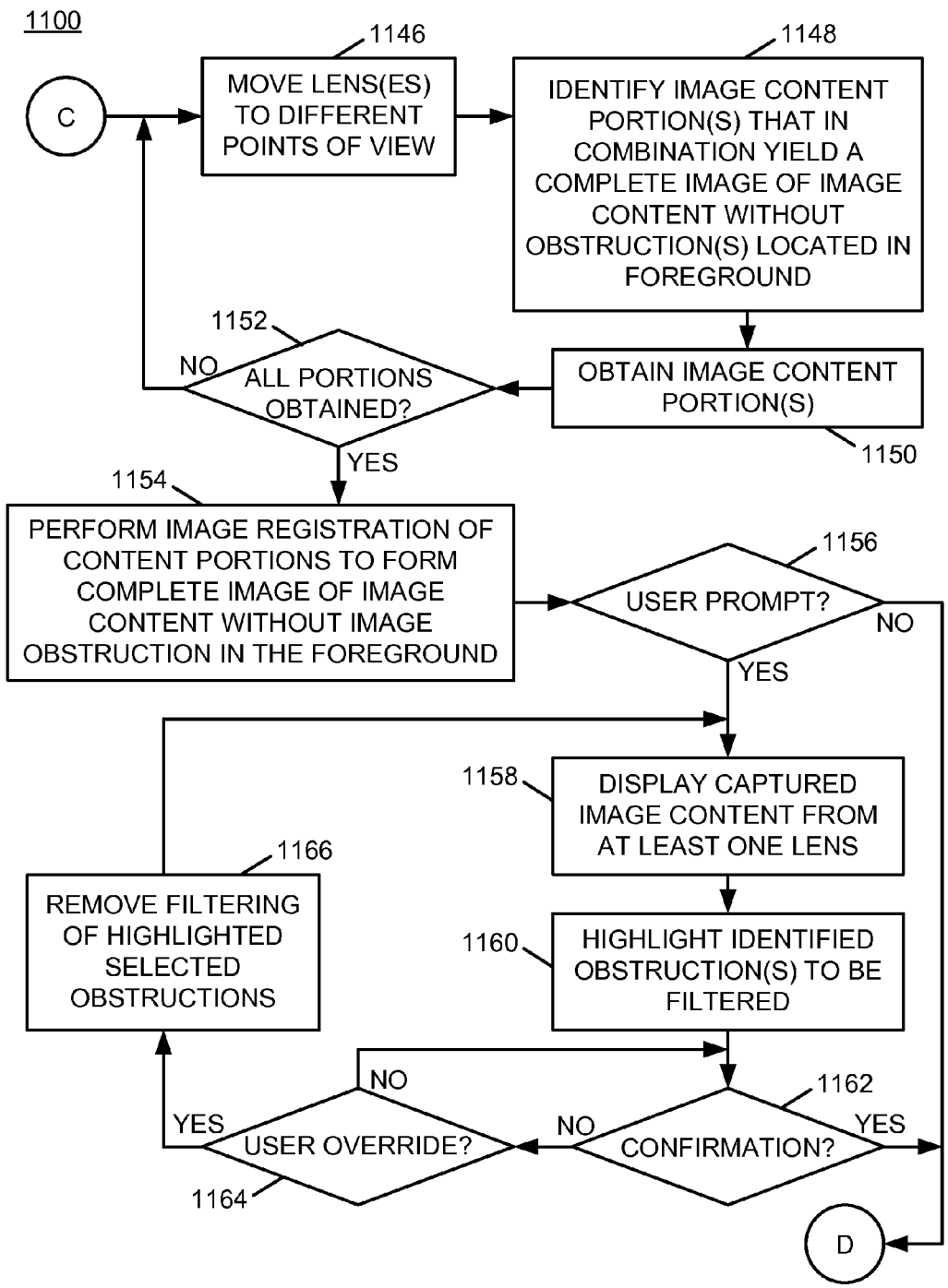
FIG. 11C is a flow chart of an example of an implementation of a second portion of additional processing of a process for automated visual obstruction removal with image capture according to an embodiment of the present subject matter.

FIG. 10 through FIG. 11C below describe example processes that may be executed by devices, such as the core processing module 900, to perform the automated visual obstruction removal with image capture associated with the present subject matter. Many other variations on the example processes are possible and all are considered within the scope of the present subject matter. The example processes may be performed by modules, such as the image processing module 922 and/or executed by the CPU 902, associated with such devices. It should be noted that time out procedures and other error control procedures are not illustrated within the example processes described below for ease of illustration purposes. However, it is understood that all such procedures are considered to be within the scope of the present subject matter.

FIG. 10 is a flow chart of an example of an implementation of a process 1000 for automated visual obstruction removal with image capture. At block 1002, the process 1000 identifies, via an image processing module, an object located within an image foreground relative to image content within a field of view of at least one camera lens as an image obstruction. At block 1004, the process 1000 determines, responsive to identifying the image obstruction, a plurality of points of view of the at least one camera lens that provide a plurality of image content portions of the image content that in combination yield a complete image of the image content without the image obstruction located within the image foreground. At block 1006, the process 1000 combines the plurality of image content portions to yield the complete image of the image content without the image obstruction located within the foreground. At block 1008, the process 1000 stores the combined complete image to a memory.

FIGS. 11A-11C illustrate a flow chart of an example of an implementation of a process 1100 for automated visual obstruction removal with image capture. FIG. 11A illustrates initial processing within the process 1100. At decision point 1102, the process 1100 makes a determination as to whether an image capture request has been detected. An image capture request may be detected, for example, in response to detection of a full or partial depression (e.g., half or first contact point) of an image capture key, such as via the input device 906. In response to determining that an image capture request has been detected, the process 1100 makes a determination at decision point 1104 as to whether a user image omission profile is available for a current user of the camera device, such as the camera device 10. As described above, multiple user image omission profiles may be utilized and each may be associated with a different camera device user. Users may input identifying information for user image omission profile selection or biometrics (e.g., fingerprints, eye scans, etc.) may be used for user image omission profile selection. Additionally, if a user image omission profile does not already exist, the user may be prompted either visually or audibly to create a profile and detection of user inputs may be detected for creation and configuration of a user image omission profile. This additional processing is not depicted to reduce complexity associated with the example process 1100.

In response to determining that a user image omission profile is available for a current user of the camera device, the process 1100 retrieves the user image omission profile from its storage location at block 1106. As also described above, user image omission profiles may be stored either remotely or locally. For example, user image omission profiles may be stored and retrieved from a database associated with a server, such as the database 806 and the server 804. Additionally or alternatively, user image omission profiles may be stored and retrieved from a local memory, such as the memory 914, association with a core processing module 900 of a camera device.

In response to determining at decision point 1104 that a user image omission profile is not available for a current user of the camera device, or upon retrieving the user image omission profile from its storage location at block 1106, the process 1100 makes a determination at decision point 1108 as to whether automated detection of obstructions is currently configured. As described above, image obstructions may be associated with and defined within an image filter repository, such as the image filter repository 808. Where at least one image has been defined as an image obstruction, automated processing for image obstruction removal may be implemented based upon the defined image obstruction(s). Image recognition technology may be used to identify images defined as image obstructions within image content for removal. Additionally, automated detection of images may be based upon a configured distance range of exclusion, such as inclusive and/or exclusive distance ranges as described above. Many other possibilities exist for automated identification of objects as image obstructions and all are considered within the scope of the present subject matter.

Processing for an affirmative determination at decision point 1108 will be deferred and described in detail below in favor of a prior description of processing for initial "manual" image obstruction identification by detection of user input and image omission profile configuration. It is understood that users may identify images in conjunction with automated image detection of obstructions and such processing is considered to form a portion of the processing described herein. However, these aspects are described as separate branches within the process 1100 for ease of description purposes. As such, in response to determining that automated detection of obstructions is not currently configured, image content within the field of view of one or more lenses is displayed on a display, such as the display 904 of a camera device, at block 1110.

At decision point 1112, the process 1100 makes a determination as to whether a display selection of an area of a touchscreen display surface of the display 904 has been detected. It should be noted that a user selection may not be detected at decision point 1112. In such a situation, the process may capture an image without modification. However, this branch of processing is not depicted for brevity in favor of processing associated with image selection and obstruction identification. As such, the processing described below assumes that a user display selection is detected. In response to determining that a display selection of an area of a touchscreen display surface of the display 904 has been detected, the process 1100 identifies a boundary of an object that is at least partially represented within the selected area of the display surface at block 1114. At block 1116, the process 1100 identifies an image area within the boundary of the object as an image obstruction that has been selected by the user.

At decision point 1118, the process 1100 makes a determination as to whether the selected object exists within an image omission profile for the current user. As noted above, this image profile may have already been retrieved if it previously existed or may be created in association with block 1106. In response to determining that the selected object does not exist within the image profile for the current user, the process 1100 configures the user image omission profile with the selected object that has been identified as an image obstruction at block 1120. As such, a user image omission profile may be updated in response to each identification of an image obstruction. At block 1122, the process 1100 adds the selected object to a database of obstruction images, such as the image filter repository 808 of the database 806.

In response to completion of adding the selected object to a database of obstruction images at block 1122 or in response to determining that the selected object exists within an image omission profile for the current user at decision point 1118, the process transitions to the processing shown and described in association with FIG. 11C for movement of one or more lenses to different points of view to remove any identified obstruction(s) from image content. Description of this additional processing will be deferred and described below in favor of returning to the description of decision point 1108.

Returning to the description of decision point 1108, in response to determining that automated detection of obstructions is currently configured, the process 1100 reads one or more images to filter/remove from image content from a database image repository, such as the image filter repository 808 of the database 806, at block 1124. Where a user image omission profile is configured, the user image omission profile may be used to identify and retrieve a subset of image items to filter from image content. This may expedite processing and communication time, while reducing bandwidth requirements.

At decision point 1126, the process 1100 makes a determination as to whether at least one distance range of exclusion relative to remaining image content, such as one or more inclusive or exclusive distance range, have been defined in association with a camera device configuration or a configured user image omission profile. In response to determining that at least one distance range of exclusion relative to remaining image content has been defined, the process 1100 transitions to the processing shown and described in association with FIG. 11B.

FIG. 11B illustrates a first portion of additional processing associated with the process 1100 for automated visual obstruction removal with image capture. At block 1128, the process 1100 performs distance calculation processing of pixels within the field of view of at least one camera lens. As described above, several options for distance calculation processing using pixels are possible and any one or more of such technologies may be used. Additionally, ultrasonic or other technologies may be used as appropriate for a given implementation. It should further be noted that certain distance calculation processing technologies for determining distance ranges of exclusion may be implemented by positioning one or more lens(es) at multiple points of view. This form of processing is described below in association with FIG. 11C for image capture and omitted within this portion of FIG. 11B for brevity. However, it is understood that similar processing to that described below in association with FIG. 11C may be implemented in this portion of the process 1100 without departure from the scope of the present subject matter. At block 1130, the process 1100 determines relative distances of objects within the field of view of the at least one camera lens based upon the performed distance calculation processing of the pixels within the field of view of the at least one camera lens. At block 1132, the process 1100 determines that at least one object is located at a distance within a configured distance range of exclusion relative to remaining image content. At block 1134, the process 1100 identifies the object as the image obstruction based upon its location within the distance range of exclusion. The process 1100 then returns to the processing described in association with FIG. 11A.

In response to determining at decision point 1126 that at least one distance range of exclusion relative to remaining image content has not been defined, or upon identifying the object as the image obstruction based upon its location within the distance range of exclusion at block 1134 (FIG. 11B), the process 1100 makes a determination at decision point 1136 as to whether to use of image recognition processing to identify objects as image obstructions is configured. In response to determining that use of image recognition processing to identify objects as image obstructions is configured, the process 1100 performs image recognition of objects within the field of view of the at least one camera lens at block 1138. At block 1140, the process 1100 compares recognized objects within the field of view of the at least one camera lens with image items within a database of configured obstruction images. As described above, where a user image omission profile is configured, a reduced number of comparisons may be performed. As such, the process 1100 may compare recognized objects within the field of view of at least one camera lens with a subset of the image items within the database of obstruction images configured within the user image omission profile for omission from captured images at block 1140. At decision point 1142, the process 1100 makes a determination as to whether at least one image item within the database of obstruction images matches the object located within the image foreground. In response to determining that at least one image item within the database of obstruction images matches the object located within the image foreground, the process 1100 identifies at least one object within the field of view as an image obstruction at block 1144.

Returning to the description of the transition to FIG. 11C, in response to any of determining that the selected object exists within an image omission profile for the current user at decision point 1118, completion of adding the selected object to a database of obstruction images at block 1122, determining at decision point 1142 that no image item within the database of obstruction images matches the object located within the image foreground, determining at decision point 1136 that the use of image recognition processing to identify objects as image obstructions is not configured, or upon identifying at least one object within the field of view as an image obstruction at block 1144, the process 1100 transitions to the processing shown and described in association with FIG. 11C.

FIG. 11C illustrates a second portion of additional processing associated with the process 1100 for automated visual obstruction removal with image capture. At block 1146, the process 1100 moves one or more lenses to different points of view. For example, the process 1100 may move at least one camera lens within at least one of a horizontal and a vertical direction to achieve multiple lens lines of sight representing different points of view. This movement may be performed, for example, via a lens controller such as the lens controller module 920 along one or more tracks, such as the track 14 or the track 26. At block 1148, the process 1100 identifies image content portions that in combination yield a complete image of the image content without the identified image obstruction(s) located within the foreground. At block 1150, the process 1100 obtains image content portions of the image content from the respective different points of view that provide the image content portions that in combination yield a complete image of the image content without the identified image obstruction(s) located within the foreground.

At decision point 1152, the process 1100 makes a determination as to whether all content portions have been obtained, which when combined, yield a complete image of the image content without the identified image obstruction(s) located within the foreground. In response to determining that all content portions have not been obtained, the process 1100 returns to block 1146 and iterates as described above to obtain additional content portions. As such, multiple image obstructions may be identified and removed either within a single set of lens movements or multiple iterations of the processing described herein as appropriate for a particular image to be captured.

In response to determining at decision point 1152 that all content portions have been obtained, the process 1100 performs image registration of the obtained image content portions to form the complete image of the image content without the image obstruction located within the foreground at block 1154. At decision point 1156, the process 1100 makes a determination as to whether to prompt the user for confirmation of the final combined image and removal of the identified image obstructions. This determination may be configurable and may be over-ridden by user input as appropriate for a given implementation. It should further be noted that image content portions may be obtained prior to prompting the user or after prompting the user as appropriate for a given implementation.

In response to determining to prompt the user for confirmation of the final combined image and removal of the identified image obstructions at decision point 1156, the process 1100 displays captured image content at block 1158. At block 1160, the process 1100 highlights identified objects to be filtered/removed from the image content. The process 1100 may further prompt the user for confirmation either with a visual prompt or an audible prompt at block 1160. At decision point 1162, the process 1100 makes a determination as to whether a confirmation of the determined object filtering/removal has been detected. A configurable time period for confirmation may be provided, such as for example via the timer/clock module 924.

In response to determining that a confirmation of the determined object filtering/removal has not been detected or that the timer has not expired, the process 1100 makes a determination at decision point 1164 as to whether a user override of automated obstruction filtering has been detected. As such, a user may override automated image identification and removal. It should additionally be noted that a toggle function may be provided to allow a user to toggle between a combined final image and a raw image with highlighted obstacles to be filtered in association with the process 1100.

In response to determining that a user override of automated obstruction filtering has not been detected, the process returns to decision point 1162 and iterates between determining whether a confirmation of the determined object filtering/removal or a timer expiration has been detected, and continues to further iterate as described above. In response to determining at decision point 1164 that a user override of automated obstruction filtering has been detected, the process 1100 removes filtering of any highlighted obstructions that have been selected by the user to indicate override of the automated obstruction filtering at block 1166 and returns to block 1158 and iterates as described above. In response to determining at decision point 1156 not to prompt the user for confirmation of the final combined image and removal of the identified image obstructions, or in response to determining at decision point 1162 that a confirmation of the determined object filtering/removal or a timer expiration has been detected, the process 1100 returns to the processing described in association with block 1168 within FIG. 11A.

Returning to the description of FIG. 11A, at block 1168 the process 1100 captures and stores the combined complete image, such as within the memory image content storage area 916 of the memory 914. The process 1100 returns to decision point 1102 and iterates as described above.

As such, the process 1100 provides one example implementation of processing for automated visual obstruction removal with image capture. User identifications via touchscreen selection of objects may be detected and selected objects may be identified as obstructions and added to either or both of a database and a user image omission profile. Automated processing may also be performed to identify objects as obstructions using a variety of techniques, such as optical image recognition, exclusive distance range processing using techniques such as distance calculation processing, and other techniques. One or more lenses are automatically moved to different points of view to obtain different image content portions of image content that in combination yield a complete image of the image content without the image obstruction located within the image foreground. Users may preview and override automated obstruction filtering and combined complete images may be captured to storage.

As described above in association with FIG. 1 through FIG. 11C, the example systems and processes provide automated visual obstruction removal with image capture. Many other variations and additional activities associated with automated visual obstruction removal with image capture are possible and all are considered within the scope of the present subject matter.

Those skilled in the art will recognize, upon consideration of the above teachings, that certain of the above examples are based upon use of a programmed processor, such as the CPU 902. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
    a memory;
    a processor programmed to:
        identify an object located within an image foreground relative to image content within a field of view of at least one camera lens as an image obstruction;
        determine, responsive to identifying the image obstruction, a plurality of points of view of the at least one camera lens that provide a plurality of image content portions of the image content that in combination yield a complete image of the image content without the image obstruction located within the image foreground, the processor being programmed to:
            move, via a lens controller, the at least one camera lens within at least one of a horizontal and a vertical direction to a first lens line of sight representing a first of the plurality of points of view;
            obtain a first of the plurality of image content portions of the image content;
            move, via the lens controller, the at least one camera lens within at least one of the horizontal and the vertical direction to a second lens line of sight representing a second of the plurality of points of view;
            obtain a second of the plurality of image content portions of the image content; and
            determine that the obtained first and second of the plurality of image content portions of the image content in combination yield the complete image of the image content without the image obstruction located within the image foreground;
        combine the plurality of image content portions to yield the complete image of the image content without the image obstruction located within the foreground; and
        store the combined complete image to the memory.

2. The system of claim 1, where, in being programmed to identify an object located within an image foreground relative to image content within a field of view of at least one camera lens as an image obstruction, the processor is programmed to:
    perform distance calculation processing of pixels within the field of view of the at least one camera lens;
    determine relative distances of objects within the field of view of the at least one camera lens based upon the performed distance calculation processing of the pixels within the field of view of the at least one camera lens;
    determine that the object is located at a distance within a configured distance range of exclusion relative to remaining image content; and
    identify the object as the image obstruction based upon its location within the distance range of exclusion.

3. The system of claim 1, where, in being programmed to identify an object located within an image foreground relative to image content within a field of view of at least one camera lens as an image obstruction, the processor is programmed to:
    perform image recognition of objects within the field of view of the at least one camera lens;
    compare recognized objects within the field of view of the at least one camera lens with image items within a database of configured obstruction images;
    determine that at least one image item within the database of obstruction images matches the object located within the image foreground; and
    identify the object as the image obstruction.

4. The system of claim 3, where, in being programmed to compare recognized objects within the field of view of the at least one camera lens with image items within a database of obstruction images, the processor is programmed to:
    retrieve a user image omission profile from a database comprising image item database identifiers of obstruction images configured for omission from captured images; and
    compare the recognized objects within the field of view of the at least one camera lens with a subset of the image items within the database of obstruction images configured within the user image omission profile for omission from captured images.

5. The system of claim 1, further comprising a display and where the processor is further programmed to:
    display the image content within the field of view of one of the at least one camera lens on the display; and where, in being programmed to identify an object located within an image foreground relative to image content within a field of view of at least one camera lens as an image obstruction, the processor is programmed to:
  detect a touchscreen selection on an area of a display surface of the display;
  identify a boundary of the object, where the object is at least partially represented within the selected area of the display surface; and
  identify an image area within the boundary of the object as the image obstruction.

6. The system of claim 5, where the image area within the boundary of the image comprises a selected object and where the processor is further programmed to:
  configure a user image omission profile with the selected object; and
  add the selected object to a database of obstruction images.

7. The system of claim 1, where, in being programmed to combine the plurality of image content portions to yield the complete image of the image content without the image obstruction located within the foreground, the processor is programmed to perform image registration of the plurality of image content portions to form the complete image of the image content without the image obstruction located within the foreground.

8. A computer program product comprising a computer readable storage device including computer readable program code, where the computer readable program code when executed on a computer causes the computer to:
  identify an object located within an image foreground relative to image content within a field of view of at least one camera lens as an image obstruction;
  determine, responsive to identifying the image obstruction, a plurality of points of view of the at least one camera lens that provide a plurality of image content portions of the image content that in combination yield a complete image of the image content without the image obstruction located within the image foreground, the computer readable program code when executed on the computer causing the computer to:
    move, via a lens controller, the at least one camera lens within at least one of a horizontal and a vertical direction to a first lens line of sight representing a first of the plurality of points of view;
    obtain a first of the plurality of image content portions of the image content;
    move, via the lens controller, the at least one camera lens within at least one of the horizontal and the vertical direction to a second lens line of sight representing a second of the plurality of points of view;
    obtain a second of the plurality of image content portions of the image content; and
    determine that the obtained first and second of the plurality of image content portions of the image content in combination yield the complete image of the image content without the image obstruction located within the image foreground;
  combine the plurality of image content portions to yield the complete image of the image content without the image obstruction located within the foreground; and
  store the combined complete image to a memory.

9. The computer program product of claim 8, where, in causing the computer to identify an object located within an image foreground relative to image content within a field of view of at least one camera lens as an image obstruction, the computer readable program code when executed on the computer causes the computer to:
  perform distance calculation processing of pixels within the field of view of the at least one camera lens;
  determine relative distances of objects within the field of view of the at least one camera lens based upon the performed distance calculation processing of the pixels within the field of view of the at least one camera lens;
  determine that the object is located at a distance within a configured distance range of exclusion relative to remaining image content; and
  identify the object as the image obstruction based upon its location within the distance range of exclusion.

10. The computer program product of claim 8, where, in causing the computer to identify an object located within an image foreground relative to image content within a field of view of at least one camera lens as an image obstruction the computer readable program code when executed on the computer causes the computer to:
  perform image recognition of objects within the field of view of the at least one camera lens;
  compare recognized objects within the field of view of the at least one camera lens with image items within a database of configured obstruction images;
  determine that at least one image item within the database of obstruction images matches the object located within the image foreground; and
  identify the object as the image obstruction.

11. The computer program product of claim 10, where, in causing the computer to compare recognized objects within the field of view of the at least one camera lens with image items within a database of obstruction images the computer readable program code when executed on the computer causes the computer to:
  retrieve a user image omission profile from a database comprising image item database identifiers of obstruction images configured for omission from captured images; and
  compare the recognized objects within the field of view of the at least one camera lens with a subset of the image items within the database of obstruction images configured within the user image omission profile for omission from captured images.

12. The computer program product of claim 8, where the computer readable program code when executed on the computer further causes the computer to:
  display the image content within the field of view of one of the at least one camera lens on a display; and
  where, in causing the computer to identify an object located within an image foreground relative to image content within a field of view of at least one camera lens as an image obstruction the computer readable program code when executed on the computer causes the computer to:
    detect a touchscreen selection on an area of a display surface of the display;
    identify a boundary of the object, where the object is at least partially represented within the selected area of the display surface; and
    identify an image area within the boundary of the object as the image obstruction.

13. The computer program product of claim 12, where the image area within the boundary of the image comprises a selected object and where the computer readable program code when executed on the computer further causes the computer to:
  configure a user image omission profile with the selected object; and
  add the selected object to a database of obstruction images.

14. The computer program product of claim 8, where, in causing the computer to combine the plurality of image content portions to yield the complete image of the image content without the image obstruction located within the foreground the computer readable program code when executed on the computer causes the computer to perform image registration of the plurality of image content portions to form the complete image of the image content without the image obstruction located within the foreground.

15. A method, comprising:
   identifying, via an image processing module, an object located within an image foreground relative to image content within a field of view of at least one camera lens as an image obstruction;
   determining, responsive to identifying the image obstruction, a plurality of points of view of the at least one camera lens that provide a plurality of image content portions of the image content that in combination yield a complete image of the image content without the image obstruction located within the image foreground, comprising:
      moving, via a lens controller, the at least one camera lens within at least one of a horizontal and a vertical direction to a first lens line of sight representing a first of the plurality of points of view;
      obtaining a first of the plurality of image content portions of the image content;
      moving, via the lens controller, the at least one camera lens within at least one of the horizontal and the vertical direction to a second lens line of sight representing a second of the plurality of points of view;
      obtaining a second of the plurality of image content portions of the image content; and
      determining that the obtained first and second of the plurality of image content portions of the image content in combination yield the complete image of the image content without the image obstruction located within the image foreground;
   combining the plurality of image content portions to yield the complete image of the image content without the image obstruction located within the foreground; and
   storing the combined complete image to a memory.

16. The method of claim 15, where identifying, via an image processing module, an object located within an image foreground relative to image content within a field of view of at least one camera lens as an image obstruction comprises:
   performing distance calculation processing of pixels within the field of view of the at least one camera lens;
   determining relative distances of objects within the field of view of the at least one camera lens based upon the performed distance calculation processing of the pixels within the field of view of the at least one camera lens;
   determining that the object is located at a distance within a configured distance range of exclusion relative to remaining image content; and
   identifying the object as the image obstruction based upon its location within the distance range of exclusion.

17. The method of claim 15, where identifying, via an image processing module, an object located within an image foreground relative to image content within a field of view of at least one camera lens as an image obstruction comprises:
   performing image recognition of objects within the field of view of the at least one camera lens;
   comparing recognized objects within the field of view of the at least one camera lens with image items within a database of configured obstruction images;
   determining that at least one image item within the database of obstruction images matches the object located within the image foreground; and
   identifying the object as the image obstruction.

18. The method of claim 17, where comparing recognized objects within the field of view of the at least one camera lens with image items within a database of obstruction images comprises:
   retrieving a user image omission profile from a database comprising image item database identifiers of obstruction images configured for omission from captured images; and
   comparing the recognized objects within the field of view of the at least one camera lens with a subset of the image items within the database of obstruction images configured within the user image omission profile for omission from captured images.

19. The method of claim 15, further comprising:
   displaying the image content within the field of view of one of the at least one camera lens on a display; and
   where identifying, via an image processing module, an object located within an image foreground relative to image content within a field of view of at least one camera lens as an image obstruction comprises:
      detecting a touchscreen selection on an area of a display surface of the display;
      identifying a boundary of the object, where the object is at least partially represented within the selected area of the display surface; and
      identifying an image area within the boundary of the object as the image obstruction.

20. The method of claim 19, where the image area within the boundary of the image comprises a selected object and further comprising:
   configuring a user image omission profile with the selected object; and
   adding the selected object to a database of obstruction images.

21. The method of claim 15, where combining the plurality of image content portions to yield the complete image of the image content without the image obstruction located within the foreground comprises performing image registration of the plurality of image content portions to form the complete image of the image content without the image obstruction located within the foreground.

* * * * *